(12) United States Patent
Kim et al.

(10) Patent No.: US 8,878,836 B2
(45) Date of Patent: Nov. 4, 2014

(54) METHOD AND APPARATUS FOR ENCODING DATASTREAM INCLUDING ADDITIONAL INFORMATION ON MULTIVIEW IMAGE AND METHOD AND APPARATUS FOR DECODING DATASTREAM BY USING THE SAME

(75) Inventors: Yong-tae Kim, Seoul (KR); Jae-yeon Song, Seoul (KR); Gun-ill Lee, Seoul (KR); Seo-young Hwang, Suwon-si (KR); Dae-sik Kim, Suwon-si (KR); Jae-seung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1084 days.

(21) Appl. No.: 12/266,870

(22) Filed: Nov. 7, 2008

(65) Prior Publication Data

US 2009/0219282 A1   Sep. 3, 2009

Related U.S. Application Data

(60) Provisional application No. 61/032,490, filed on Feb. 29, 2008.

(30) Foreign Application Priority Data

May 14, 2008 (KR) .......................... 10-2008-0044722

(51) Int. Cl.
*G06T 15/00* (2011.01)
*H04N 19/50* (2014.01)
*H04N 19/597* (2014.01)

(52) U.S. Cl.
CPC ........... *H04N 7/32* (2013.01); *H04N 19/00769* (2013.01)
USPC .......................................................... 345/419

(58) Field of Classification Search
CPC ............ G06T 15/00; H04N 7/00; H04N 9/80; H04N 13/00
See application file for complete search history.

(56) References Cited

U.S. PATENT DOCUMENTS

| 6,621,921 | B1* | 9/2003 | Matsugu et al. | 382/154 |
|---|---|---|---|---|
| 2004/0120396 | A1* | 6/2004 | Yun et al. | 375/240.01 |
| 2005/0190180 | A1* | 9/2005 | Jin et al. | 345/419 |
| 2007/0081814 | A1 | 4/2007 | Ha et al. | |
| 2007/0186005 | A1* | 8/2007 | Setlur et al. | 709/231 |
| 2009/0022222 | A1* | 1/2009 | He et al. | 375/240.12 |
| 2009/0160932 | A1 | 6/2009 | Kim et al. | |
| 2011/0002594 | A1* | 1/2011 | Kim et al. | 386/248 |

FOREIGN PATENT DOCUMENTS

KR   1020070040286 A   4/2007
KR   10-2009-0037270 A   4/2009

OTHER PUBLICATIONS

Communication dated May 15, 2014 issued by the Korean Intellectual Property Office in counterpart Korean Patent Application No. 1020080044722.

* cited by examiner

*Primary Examiner* — Ke Xiao
*Assistant Examiner* — Weiming He
(74) *Attorney, Agent, or Firm* — Sughrue Mion, PLLC

(57) ABSTRACT

Provided are a method and apparatus for encoding and decoding a datastream into which multiview image information is inserted. The method of decoding a multiview image datastream includes extracting multiview image information including information on at least one view image of a multiview image, from at least one elementary stream of the multiview image datastream; extracting a multiview image parameter regarding the multiview image based on the number of elementary streams and a correlation between view images of the multiview image; and restoring the multiview image by using the extracted multiview image parameter and the extracted multiview image information.

44 Claims, 18 Drawing Sheets

FIG. 4

| ftyp | | | | | file type and compatibility |
|---|---|---|---|---|---|
| moov | 410 | | | | container for all the metadata of timed resources |
| | ✕ | | | | |
| | trak | 420 | | | container for an individual track or stream indicate Main AV data or auxiliary data |
| | | ✕ | | | |
| | | meta | | | |
| | | | ✕ — 430 | | |
| | | mdia | | | container for the media information in a track |
| | | | ✕ — 440 | | |
| | | | stbl | | |
| | | | 450 — ✕ | | |
| mdat | | | | | media data container |
| meta | | | | | Metadata |
| | cmsi | | | | Stereoscopic and mono information |

460

FIG. 5 unsigend int(16)   expected_display_width;  — 510 unsigend int(16)   expected_display_height;  — 520 unsigend int(16)   expected_viewing_distance;  — 530 int(16)            min_of_disparity;  — 540 int(16)            max_of_disparity;  — 550

FIG. 7A

```
int(32)   translation[3];  — 700
unsigned int(32)   focal_length;  — 710
unsigned int(1)    is_camera_cross;  — 720
if(is_camera_cross){
   unsigned int(32) rotation[3];  — 730
}
```

FIG. 7B

```
int(32)   translation;  — 705
unsigned int(32)   focal_length;  — 710
unsigned int(1)    is_camera_cross;  — 720
if(is_camera_cross){
   unsigned int(32) rotation;  — 735
}
``` unsigned int(1)   is_camera_cross; — 910 int(32)   translation_L[3]; — 920
unsigned int(32)   focal_length_L; — 930
unsigned int(32)   rotation_L[3]; — 940 int(32)   translation_R[3]; — 950
unsigned int(32)   focal_length_R; — 960
unsigned int(32)   rotation_R[3]; — 970

FIG. 12A aligned(8) class StereoscopicVideoMediaInformationBox extends — 1200
FullBox('svmi', version = 0, 0){

1210 {
// STEREOSCOPIC VIEW INFORMATION
unsigned int(8) stereoscopic_composition_type; — 1220
unsigned int(1) is_left_first; — 1225
unsigned int(1) is_matching_cmsi; — 1230
}

1260 {
// STEREO / MONO CHANGE INFORMATION
unsigned int(32) stereo_mono_change_count; — 1270
for(i=0; i<stereo_mono_change_count; i++){
    unsigned int(32) sample_count; — 1280
    unsigned int(1) stereo_flag; — 1290
}

FIG. 12B aligned(8) class StereoscopicVideoMediaInformationBox extends — 1202
FullBox('svmi', version = 0, 0){

1212 {
// STEREOSCOPIC VIEW INFORMATION
unsigned int(8) stereoscopic_composition_type; — 1220
unsigned int(1) is_left_first; — 1225
unsigned int(1) is_matching_cmsi; — 1230
unsigned int(1) is_cmsi_here; — 1240
}

1260 {
// STEREO / MONO CHANGE INFORMATION
unsigned int(32) stereo_mono_change_count; — 1270
for(i=0; i<stereo_mono_change_count; i++){
    unsigned int(32) sample_count; — 1280
    unsigned int(1) stereo_flag; — 1290
}

FIG. 12C

```
aligned(8) class StereoscopicVideoMediaInformationBox extends  — 1204
    FullBox('svmi', version = 0, 0){
        // STEREOSCOPIC VIEW INFORMATION
        unsigned int(8)   stereoscopic_composition_type;  — 1220
1214    unsigned int(1)   is_left_first;  — 1225
        unsigned int(1)   is_matching_cmsi;  — 1230
        unsigned int(8)   matching_ESID_of_cmsi;  — 1250

// STEREO / MONO CHANGE INFORMATION
        unsigned int(32)  stereo_mono_change_count;  — 1270
1260    for(i=0; i<stereo_mono_change_count; i++){
            unsigned int(32)  sample_count;  — 1280
            unsigned int(1)   stereo_flag;  — 1290
        }
    }
```

```
aligned(8) class MultiviewVideoInformationBox extends     ─ 1400
FullBox('mvvi', version = 0, 0){
unsigned int(1)   is_main_view;    ─ 1410
unsigned int(1)   view_ordering;   ─ 1420
unsigned int(8)   view_ID;         ─ 1430
}
```

METHOD AND APPARATUS FOR ENCODING DATASTREAM INCLUDING ADDITIONAL INFORMATION ON MULTIVIEW IMAGE AND METHOD AND APPARATUS FOR DECODING DATASTREAM BY USING THE SAME

CROSS-REFERENCE TO RELATED PATENT APPLICATION

This application claims the benefit of U.S. Provisional Application No. 61/032,490, filed on Feb. 29, 2008, in the U.S. Patent and Trademark Office, and Korean Patent Application No. 10-2008-0044722, filed on May 14, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to encoding and decoding a datastream into which multiview image information is inserted.

2. Description of the Related Art

In the current field of image technology, research on methods of implementing three-dimensional (3D) images is being actively conducted. By more effectively implementing 3D images, it may be possible to more realistically represent a 3D reality. A current 3D image reproduction method takes advantage of human visual characteristics and uses a principal that a user will gain a sense of 3D imaging when left view and right view images are projected at appropriate positions and times through use of a conventional two-dimensional (2D) display device and thus images are being formed to have left view image information and right view image information to separately form images for left and right eyes of the user.

However, fatigue occurring when users view 3D images produced according to the current 3D image reproduction method, is a large obstacle to the spread of 3D image applications and the development of 3D image technologies.

SUMMARY OF THE INVENTION

The present invention provides a method and apparatus for encoding a multiview image datastream of a three-dimensional (3D) image in order to efficiently store and transmit 3D reproduction information by including additional information that is defined in order to correctly restore the 3D image, into the multiview image datastream.

The present invention also provides a method and apparatus for decoding a multiview image datastream of a 3D image in order to extract additional information that is needed to correctly and stably restore the 3D image from the multiview image datastream.

According to an aspect of the present invention, there is provided a method of encoding a multiview image datastream including at least one elementary stream, the method including inserting multiview image information including information on at least one view image of a multiview image, into the elementary stream of the multiview image datastream; determining a multiview image parameter regarding the multiview image based on the number of elementary streams and a correlation between view images of the multiview image; and inserting the multiview image parameter into the multiview image datastream.

The multiview image parameter may include at least one of a camera parameter regarding cameras for obtaining the multiview image, and a low fatigue parameter for stably viewing the multiview image.

The low fatigue parameter may include at least one of a display screen width parameter, a display screen height parameter, a viewing distance parameter, a maximum disparity parameter between view images, and a minimum disparity parameter between view images.

The determining of the multiview image parameter may include determining the display screen width parameter, the display screen height parameter, and the viewing distance parameter so as to have the same values for all view images of the multiview image.

The determining of the multiview image parameter may include determining the maximum disparity parameter between view images and the minimum disparity parameter between view images of each view image so as to have values which are relatively defined based on a reference view image of the multiview image.

The inserting of the multiview image parameter may include inserting the multiview image parameter into an upper level box of a box into which elementary-stream-related information of the multiview image information is inserted.

The inserting of the multiview image parameter may include inserting the multiview image parameter into a box that is at the same level as a box into which the elementary-stream-related information on each of additional view images which are not a reference view image of the multiview image, is inserted.

The camera parameter may include at least one of a translation parameter, a rotation parameter, and a focal length parameter regarding the cameras, the translation parameter may be defined as one value if camera coordinate systems of the view images share an axis, and may be defined as a matrix having two or more values if the camera coordinate systems of the view images do not share an axis, and the rotation parameter may be defined as one value or a matrix having two or more values.

The inserting of the multiview image information may include inserting a composite image including all view images of the multiview image, into one elementary stream of the multiview image datastream, and the determining of the multiview image parameter may include relatively defining the camera parameter for each of additional view images which are not a reference view image of the multiview image, based on the reference view image.

The inserting of the multiview image information may include inserting a composite image including all view images of the multiview image, into one elementary stream of the multiview image datastream, and the determining of the multiview image parameter may include independently defining the camera parameter for each view image of the multiview image.

The inserting of the multiview image parameter may include inserting the camera parameter that is defined independently for each view image, into a different box in a header region of the multiview image datastream.

The inserting of the multiview image parameter may include inserting the camera parameter that is defined independently for each view image, into one predetermined box in a header region of the multiview image datastream.

The number of elementary streams included in the multiview image datastream may be equal to or greater than the number of the view images of the multiview image, and the inserting of the multiview image information may include inserting each view image into a different elementary stream, and the determining of the multiview image parameter may include relatively defining the camera parameter regarding each of additional view images which are not a reference view image of the multiview image, based on the reference view image.

The determining of the multiview image parameter may further include determining a parameter indicating whether the multiview image parameter regarding a matching view image of a current view image exists when the multiview image parameter regarding the current view image is determined.

The determining of the multiview image parameter may further include determining a parameter indicating whether the multiview image parameter regarding a current view image exists.

The determining of the multiview image parameter may further include determining a parameter indicating identification information of an elementary stream of a matching view image of a current view image when the multiview image parameter regarding the current view image is determined.

The number of elementary streams included in the multiview image datastream may be equal to or greater than the number of the view images of the multiview image, and the inserting of the multiview image information may include inserting each view image into a different elementary stream, and the determining of the multiview image parameter may include independently defining the camera parameter for each view image of the multiview image.

If the multiview image has three or more views, the determining of the multiview image parameter may further include determining at least one of a parameter indicating an elementary stream of a reference view image, a parameter indicating each view, and a parameter indicating an arrangement order of each view.

If the multiview image datastream is an International Standards Organization (ISO)-based media file format, the ISO-based media file format may include a moov box, an mdat box, and a meta box, and the inserting of the multiview image parameter may include inserting the multiview image parameter into at least one of a sub level box of the meta box, a sub level box of the moov box, a sub level box of a trak box that is a sub level box of the moov box, a sub level box of a trak box, and a sub level box of a meta box that is a sub level box of the trak box.

If the multiview image parameter is defined independently for each view image of the multiview image, the inserting of the multiview image parameter may include inserting the multiview image parameter into a box at the same level as a box corresponding to an elementary stream of each view image.

If the multiview image parameter is defined independently for each view image of the multiview image, the inserting of the multiview image parameter may include inserting the multiview image parameter into one predetermined box in a header region of the multiview image datastream.

If the multiview image parameter regarding each of additional view images which are not a reference view image of the multiview image, is relatively defined based on the reference view image, the inserting of the multiview image parameter may include inserting the multiview image parameter regarding each of the additional view images, into a box at the same level as a box corresponding to an elementary stream of each of the additional view images.

According to another aspect of the present invention, there is provided a method of decoding a multiview image datastream including at least one elementary stream, the method including extracting multiview image information including information on at least one view image of a multiview image, from the elementary stream of the multiview image datastream; extracting a multiview image parameter regarding the multiview image based on the number of elementary streams and a correlation between view images of the multiview image; and restoring the multiview image by using the extracted multiview image parameter and the extracted multiview image information.

The multiview image parameter may include at least one of a camera parameter regarding cameras used to obtain the multiview image, and a low fatigue parameter for stably viewing the multiview image.

The low fatigue parameter may include at least one of a display screen width parameter, a display screen height parameter, a viewing distance parameter, a maximum disparity parameter between view images, and a minimum disparity parameter between view images.

The display screen width parameter, the display screen height parameter, and the viewing distance parameter may have the same values for all view images of the multiview image.

The maximum disparity parameter between view images and the minimum disparity parameter between view images of each view image may have values which are relatively defined based on a reference view image of the multiview image.

The extracting of the multiview image parameter may include extracting the multiview image parameter from an upper level box of a box into which elementary-stream-related information of the multiview image information is inserted.

The extracting of the multiview image parameter may include extracting the multiview image parameter from a box that is at the same level as a box into which the elementary-stream-related information on each of additional view images which are not a reference view image of the multiview image, is inserted.

The camera parameter may include at least one of a translation parameter, a rotation parameter, and a focal length parameter regarding the cameras, the translation parameter may be defined as one value if camera coordinate systems of the view images share an axis, and may be defined as a matrix having two or more values if the camera coordinate systems of the view images do not share an axis, and the rotation parameter may be defined as one value or a matrix having two or more values.

The extracting of the multiview image information may include extracting a composite image including all view images of the multiview image, from one elementary stream of the multiview image datastream, and the extracting of the multiview image parameter may include extracting the camera parameter that is relatively defined on each of additional view images which are not a reference view image of the multiview image, based on the reference view image, from the multiview image datastream.

The extracting of the multiview image information may include extracting a composite image including all view images of the multiview image, from one elementary stream of the multiview image datastream, and the extracting of the multiview image parameter may include extracting the camera parameter that is defined independently for each view image of the multiview image, from the multiview image datastream.

The extracting of the multiview image parameter may further include extracting the camera parameter that is defined independently for each view image, from a different box in a header region of the multiview image datastream.

The extracting of the multiview image parameter may include extracting the camera parameter that is defined independently for each view image, from one predetermined box in a header region of the multiview image datastream.

If the number of elementary streams included in the multiview image datastream is equal to or greater than the number of the view images of the multiview image, the extracting of the multiview image information may include extracting each view image from a different elementary stream, and the extracting of the multiview image parameter may include extracting the camera parameter that is relatively defined on each of additional view images which are not a reference view image of the multiview image, based on the reference view image, from the multiview image datastream.

The extracting of the multiview image parameter may further include extracting a parameter indicating whether the multiview image parameter regarding a matching view image of a current view image exists when the multiview image parameter regarding the current view image is determined, from the multiview image datastream.

The extracting of the multiview image parameter may further include extracting a parameter indicating whether the multiview image parameter regarding a current view image exists, from the multiview image datastream.

The extracting of the multiview image parameter may further include extracting a parameter indicating identification information of an elementary stream of a matching view image of a current view image when the multiview image parameter regarding the current view image is determined, from the multiview image datastream.

If the number of elementary streams included in the multiview image datastream is equal to or greater than the number of the view images of the multiview image, the extracting of the multiview image information may include extracting each view image from a different elementary stream, and the extracting of the multiview image parameter may include extracting the camera parameter that is defined independently for each view image of the multiview image, from the multiview image datastream.

If the multiview image has three or more views, the extracting of the multiview image parameter may further include extracting at least one of a parameter indicating an elementary stream of a reference view image, a parameter indicating each view, and a parameter indicating an arrangement order of each view, from the multiview image datastream.

If the multiview image datastream is an International Standards Organization (ISO)-based media file format, the ISO-based media file format may include a moov box, an mdat box, and a meta box, and the extracting of the multiview image parameter may include extracting the multiview image parameter from at least one of a sub level box of the meta box, a sub level box of the moov box, a sub level box of a trak box that is a sub level box of the moov box, a sub level box of a trak box, and a sub level box of a meta box that is a sub level box of the trak box.

If the multiview image parameter is defined independently for each view image of the multiview image, the extracting of the multiview image parameter may include extracting the multiview image parameter from a box at the same level as a box corresponding to an elementary stream of each view image.

If the multiview image parameter is defined independently for each view image of the multiview image, the extracting of the multiview image parameter may include extracting the multiview image parameter from one predetermined box in a header region of the multiview image datastream.

If the multiview image parameter regarding each of additional view images which are not a reference view image of the multiview image, is relatively defined based on the reference view image, the extracting of the multiview image parameter may include extracting the multiview image parameter regarding each of the additional view images, from a box at the same level as a box corresponding to an elementary stream of each of the additional view images.

According to another aspect of the present invention, there is provided an apparatus for encoding a multiview image datastream including at least one elementary stream, the apparatus including a multiview image information insertion unit which inserts multiview image information including information on at least one view image of a multiview image, into the elementary stream of the multiview image datastream; a multiview image parameter determination unit which determines a multiview image parameter regarding the multiview image based on the number of elementary streams and a correlation between view images of the multiview image; and a multiview image parameter insertion unit which inserts the multiview image parameter into the multiview image datastream.

The multiview image parameter may include at least one of a camera parameter regarding cameras used to obtain the multiview image, and a low fatigue parameter for stably viewing the multiview image.

The low fatigue parameter may include at least one of a display screen width parameter, a display screen height parameter, a viewing distance parameter, a maximum disparity parameter between view images, and a minimum disparity parameter between view images.

The multiview image parameter determination unit may determine the display screen width parameter, the display screen height parameter, and the viewing distance parameter so as to have the same values for all view images of the multiview image.

The multiview image parameter determination unit may determine the maximum disparity parameter between view images and the minimum disparity parameter between view images of each view image so as to have values which are relatively defined based on a reference view image of the multiview image.

The multiview image parameter insertion unit may insert the multiview image parameter into an upper level box of a box into which elementary-stream-related information of the multiview image information is inserted.

The multiview image parameter insertion unit may insert the multiview image parameter into a box that is at the same level as a box into which the elementary-stream-related information on each of additional view images which are not a reference view image of the multiview image, is inserted.

The camera parameter may include at least one of a translation parameter, a rotation parameter, and a focal length parameter regarding the cameras, the translation parameter may be defined as one value if camera coordinate systems of the view images share an axis, and may be defined as a matrix having two or more values if the camera coordinate systems of the view images do not share an axis, and the rotation parameter may be defined as one value or a matrix having two or more values.

The multiview image information insertion unit may insert a composite image including all view images of the multiview image, into one elementary stream of the multiview image datastream, and the multiview image parameter determination unit may relatively define the camera parameter regarding each of additional view images which are not a reference view image of the multiview image, based on the reference view image.

The multiview image information insertion unit may insert a composite image including all view images of the multiview image, into one elementary stream of the multiview image datastream, and the multiview image parameter determination unit may independently define the camera parameter for each view image of the multiview image.

The multiview image parameter insertion unit may insert the camera parameter that is defined independently for each view image, into a different box in a header region of the multiview image datastream.

The multiview image parameter insertion unit may insert the camera parameter that is defined independently for each view image, into one predetermined box in a header region of the multiview image datastream.

The number of elementary streams included in the multiview image datastream may be equal to or greater than the number of the view images of the multiview image, and the multiview image information insertion unit may insert each view image into a different elementary stream, and the multiview image parameter determination unit may relatively represent the camera parameter regarding each of additional view images which are not a reference view image of the multiview image, based on the reference view image.

The multiview image parameter determination unit may further determine a parameter indicating whether the multiview image parameter regarding a matching view image of a current view image exists when the multiview image parameter regarding the current view image is determined.

The multiview image parameter determination unit may further determine a parameter indicating whether the multiview image parameter regarding a current view image exists.

The multiview image parameter determination unit may further determine a parameter indicating identification information of an elementary stream of a matching view image of a current view image when the multiview image parameter regarding the current view image is determined.

The number of elementary streams included in the multiview image datastream may be equal to or greater than the number of the view images of the multiview image, and the multiview image information insertion unit may insert each view image into a different elementary stream, and the multiview image parameter determination unit may independently define the camera parameter for each view image of the multiview image.

If the multiview image has three or more views, the multiview image parameter determination unit may further determine at least one of a parameter indicating an elementary stream of a reference view image, a parameter indicating each view, and a parameter indicating an arrangement order of each view.

If the multiview image datastream is an International Standards Organization (ISO)-based media file format, the ISO-based media file format may include a moov box, an mdat box, and a meta box, and the multiview image parameter insertion unit may insert the multiview image parameter into at least one of a sub level box of the meta box, a sub level box of the moov box, a sub level box of a trak box that is a sub level box of the moov box, a sub level box of a trak box, and a sub level box of a meta box that is a sub level box of the trak box.

If the multiview image parameter is defined independently for each view image of the multiview image, the multiview image parameter insertion unit may insert the multiview image parameter into a box at the same level as a box corresponding to an elementary stream of each view image.

If the multiview image parameter is defined independently for each view image of the multiview image, the multiview image parameter insertion unit may insert the multiview image parameter into one predetermined box in a header region of the multiview image datastream.

If the multiview image parameter regarding each of additional view images which are not a reference view image of the multiview image, is relatively defined based on the reference view image, the multiview image parameter insertion unit may insert the multiview image parameter regarding each of the additional view images, into a box at the same level as a box corresponding to an elementary stream of each of the additional view images.

According to another aspect of the present invention, there is provided an apparatus for decoding a multiview image datastream including at least one elementary stream, the apparatus including a multiview image information extraction unit which extracts multiview image information including information on at least one view image of a multiview image, from the elementary stream of the multiview image datastream; a multiview image parameter extraction unit which extracts a multiview image parameter regarding the multiview image based on the number of elementary streams and a correlation between view images of the multiview image; and a multiview image restoration unit which restores the multiview image by using the extracted multiview image parameter and the extracted multiview image information.

The multiview image parameter may include at least one of a camera parameter regarding cameras used to obtain the multiview image, and a low fatigue parameter for stably viewing the multiview image.

The low fatigue parameter may include at least one of a display screen width parameter, a display screen height parameter, a viewing distance parameter, a maximum disparity parameter between view images, and a minimum disparity parameter between view images.

The display screen width parameter, the display screen height parameter, and the viewing distance parameter may have the same values for all view images of the multiview image.

The maximum disparity parameter between view images and the minimum disparity parameter between view images of each view image may have values which are relatively defined based on a reference view image of the multiview image.

The multiview image parameter extraction unit may extract the multiview image parameter from an upper level box of a box into which elementary-stream-related information of the multiview image information is inserted.

The multiview image parameter extraction unit may extract the multiview image parameter from a box that is at the same level as a box into which the elementary-stream-related information on each of additional view images which are not a reference view image of the multiview image, is inserted.

The camera parameter may include at least one of a translation parameter, a rotation parameter, and a focal length parameter regarding the cameras, the translation parameter may be defined as one value if camera coordinate systems of the view images share an axis, and may be defined as a matrix having two or more values if the camera coordinate systems of the view images do not share an axis, and the rotation parameter may be defined as one value or a matrix having two or more values.

The multiview image information extraction unit may extract a composite image including all view images of the multiview image, from one elementary stream of the multiview image datastream, and the multiview image parameter extraction unit may extract the camera parameter that is relatively defined on each of additional view images which are not a reference view image of the multiview image, based on the reference view image, from the multiview image datastream.

The multiview image information extraction unit may extract a composite image including all view images of the multiview image, from one elementary stream of the multiview image datastream, and the multiview image parameter extraction unit may extract the camera parameter that is defined independently for each view image of the multiview image, from the multiview image datastream.

The multiview image parameter extraction unit may further extract the camera parameter that is defined independently for each view image, from a different box in a header region of the multiview image datastream.

The multiview image parameter extraction unit may extract the camera parameter that is defined independently for each view image, from one predetermined box in a header region of the multiview image datastream.

If the number of elementary streams included in the multiview image datastream is equal to or greater than the number of the view images of the multiview image, the multiview image information extraction unit may extract each view image from a different elementary stream, and the multiview image parameter extraction unit may extract the camera parameter that is relatively defined on each of additional view images which are not a reference view image of the multiview image, based on the reference view image, from the multiview image datastream.

The multiview image parameter extraction unit may further extract a parameter indicating whether the multiview image parameter regarding a matching view image of a current view image exists when the multiview image parameter regarding the current view image is determined, from the multiview image datastream.

The multiview image parameter extraction unit may further extract a parameter indicating whether the multiview image parameter regarding a current view image exists, from the multiview image datastream.

The multiview image parameter extraction unit may further extract a parameter indicating identification information of an elementary stream of a matching view image of a current view image when the multiview image parameter regarding the current view image is determined, from the multiview image datastream.

If the number of elementary streams included in the multiview image datastream is equal to or greater than the number of the view images of the multiview image, the multiview image information extraction unit may extract each view image from a different elementary stream, and the multiview image parameter extraction unit may extract the camera parameter that is defined independently for each view image of the multiview image, from the multiview image datastream.

If the multiview image has three or more views, the multiview image parameter extraction unit may further extract at least one of a parameter indicating an elementary stream of a reference view image, a parameter indicating each view, and a parameter indicating an arrangement order of each view, from the multiview image datastream.

If the multiview image datastream is an International Standards Organization (ISO)-based media file format, the ISO-based media file format may include a moov box, an mdat box, and a meta box, and the multiview image parameter extraction unit may extract the multiview image parameter from at least one of a sub level box of the meta box, a sub level box of the moov box, a sub level box of a trak box that is a sub level box of the moov box, a sub level box of a trak box, and a sub level box of a meta box that is a sub level box of the trak box.

If the multiview image parameter is defined independently for each view image of the multiview image, the multiview image parameter extraction unit may extract the multiview image parameter from a box at the same level as a box corresponding to an elementary stream of each view image.

If the multiview image parameter is defined independently for each view image of the multiview image, the multiview image parameter extraction unit may extract the multiview image parameter from one predetermined box in a header region of the multiview image datastream.

If the multiview image parameter regarding each of additional view images which are not a reference view image of the multiview image, is relatively defined based on the reference view image, the multiview image parameter extraction unit may extract the multiview image parameter regarding each of the additional view images, from a box at the same level as a box corresponding to an elementary stream of each of the additional view images.

According to another aspect of the present invention, there is provided a computer readable recording medium having recorded thereon a computer program for executing the above method of encoding a multiview image datastream.

According to another aspect of the present invention, there is provided a computer readable recording medium having recorded thereon a computer program for executing the above method of decoding a multiview image datastream.

BRIEF DESCRIPTION OF THE DRAWINGS

The above and other features of the present invention will become more apparent by describing in detail exemplary embodiments thereof with reference to the attached drawings in which:

FIG. 4 is a diagram illustrating a list of various boxes of an ISO-based media file format;

FIG. 5 is a diagram illustrating syntax of a low fatigue parameter regarding a multiview image, according to an exemplary embodiment of the present invention;

FIG. 7A is a diagram illustrating syntax of a camera parameter regarding a multiview image, according to an exemplary embodiment of the present invention;

FIG. 7B is a diagram illustrating syntax of a camera parameter regarding a multiview image, according to another exemplary embodiment of the present invention;

FIG. 12A is a diagram illustrating syntax of a multiview image parameter according to an exemplary embodiment of the present invention;

FIG. 12B is a diagram illustrating syntax of a multiview image parameter according to another exemplary embodiment of the present invention;

FIG. 12C is a diagram illustrating syntax of a multiview image parameter according to another exemplary embodiment of the present invention;

DETAILED DESCRIPTION OF EXEMPLARY EMBODIMENTS OF THE INVENTION

Hereinafter, the present invention will be described in detail by explaining embodiments of the invention with reference to the attached drawings.

Figure 1:
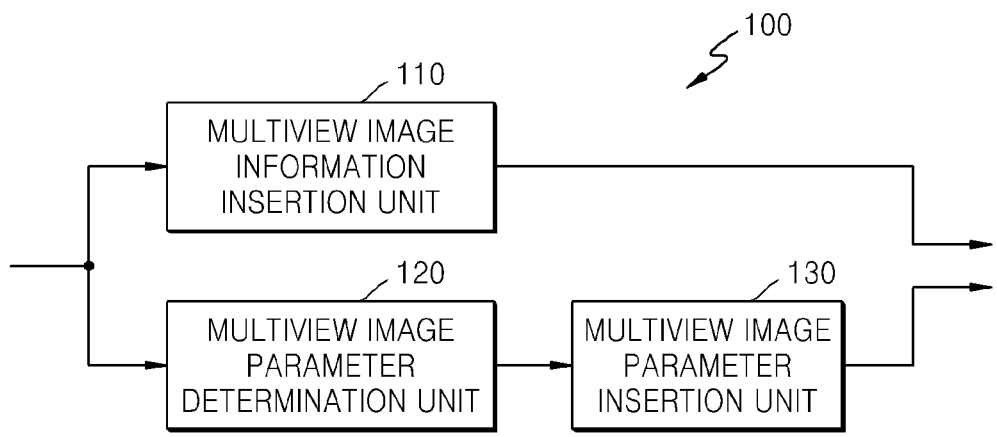
FIG. 1 is a block diagram of a multiview image datastream encoding apparatus according to an exemplary embodiment of the present invention.

FIG. 1 is a block diagram of a multiview image datastream encoding apparatus 100 according to an embodiment of the present invention.

Referring to FIG. 1, the multiview image datastream encoding apparatus 100 includes a multiview image information insertion unit 110, a multiview image parameter determination unit 120, and a multiview image parameter insertion unit 130.

The multiview image information insertion unit 110 receives multiview image information including information on at least one view image of a multiview image, and outputs the multiview image information by inserting the multiview image information into at least one elementary stream of a multiview image datastream. The multiview image information may include information on left and right views, or three or more views.

The multiview image parameter determination unit 120 determines a parameter regarding the multiview image (hereinafter referred to as a 'multiview image parameter') based on the number of elementary streams included in a current multiview image datastream into which the received multiview image information is inserted, and a correlation between view images of the multiview image, and then outputs a determination result to the multiview image parameter insertion unit 130.

The multiview image parameter may include at least one of a camera parameter providing information on camera(s) used to obtain the multiview image, and a low fatigue parameter for stably viewing the multiview image.

The number of elementary streams may be determined based on a fact, for example, whether information on each view image of the multiview image is included in one elementary stream, or information on a plurality of view images of the multiview image is inserted into a plurality of elementary streams in a one-to-one correspondence. The correlation between view images of the multiview image may be used to determine whether each view image refers to information on another view image when a parameter regarding the view image is determined.

The multiview image parameter insertion unit 130 receives the multiview image parameter from the multiview image parameter determination unit 120, and outputs the multiview image parameter by inserting the multiview image parameter into a predetermined position of the multiview image datastream.

The multiview image parameter insertion unit 130 may determine the predetermined position of the multiview image datastream, into which the multiview image parameter is inserted, based on the number of elementary streams and the correlation between view images.

Figure 2:
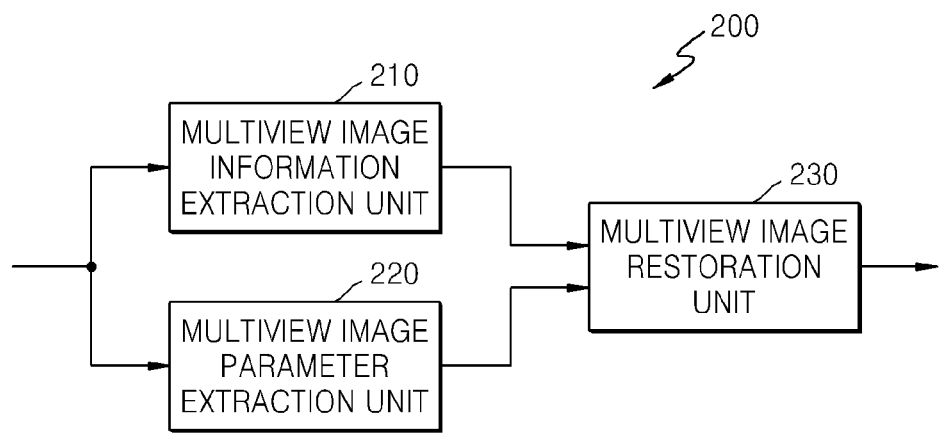
FIG. 2 is a block diagram of a multiview image datastream decoding apparatus according to an exemplary embodiment of the present invention.

FIG. 2 is a block diagram of a multiview image datastream decoding apparatus 200 according to an embodiment of the present invention.

Referring to FIG. 2, the multiview image datastream decoding apparatus 200 includes a multiview image information extraction unit 210, a multiview image parameter extraction unit 220, and a multiview image restoration unit 230.

The multiview image information extraction unit 210 extracts multiview image information including information on at least one view image of a multiview image from at least one elementary stream of a received multiview image datastream, and outputs the multiview image information to the multiview image restoration unit 230.

The multiview image information extraction unit 210 may extract the multiview image information from only one elementary stream of a current multiview image datastream or may extract different multiview image information from a plurality of elementary streams of the current multiview image datastream.

The multiview image parameter extraction unit 220 extracts a multiview image parameter from the received multiview image datastream based on the number of elementary streams and a correlation between view images of the multiview image, and outputs the multiview image parameter to the multiview image restoration unit 230.

The multiview image parameter may include information on the number of elementary streams included in a current multiview image datastream. The multiview image parameter may also include information indicating whether the multiview image information is separated for each view image. Thus, although not shown in FIG. 2, the multiview image information extraction unit 210 may extract the multiview image information from at least one elementary stream based on the information on the number of elementary streams and the information indicating whether the multiview image information is separated for each view image, which are extracted by the multiview image parameter extraction unit 220.

The multiview image parameter of the multiview image datastream decoding apparatus 200 is identical to the multiview image parameter of the multiview image datastream encoding apparatus 100 illustrated in FIG. 1.

The multiview image restoration unit 230 restores each view image of the multiview image by using the multiview image information received from the multiview image information extraction unit 210 and the multiview image parameter received from the multiview image parameter extraction unit 220.

Examples of a multiview image datastream encoded by the multiview image datastream encoding apparatus 100 illustrated in FIG. 1, and a multiview image datastream decoded by the multiview image datastream decoding apparatus 200 illustrated in FIG. 2 will now be described with reference to FIGS. 3 and 4.

Figure 3:
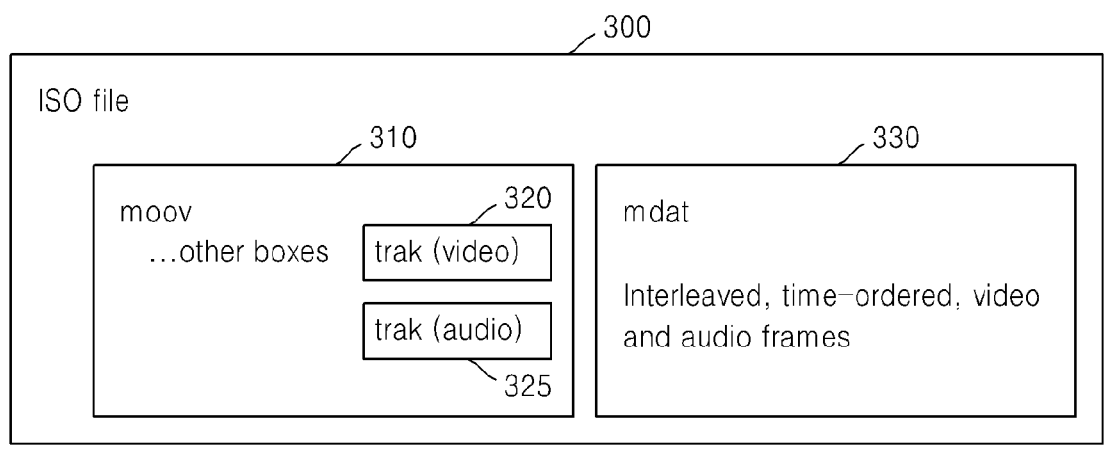
FIG. 3 is a diagram illustrating a schematic structure of an International Standards Organization (ISO)-based media file format.

FIG. 3 is a diagram illustrating a schematic structure of an International Standards Organization (ISO)-based media file format 300.

Referring to FIG. 3, the ISO-based media file format 300 mainly includes a moov box 310 and an mdat box 330. A multiview image datastream according to an embodiment of the present invention may employ the ISO-based media file format 300. Media data including interleaved and time-ordered video and audio frames is stored in the mdat box 330 of the ISO-based media file format 300.

All metadata of timed resources is inserted into the moov box 310. The moov box 310 may include trak boxes 320 and 325 which include information on the media data (video and audio) included in the mdat box 330. The moov box 310 may include other boxes in addition to the trak boxes 320 and 325.

FIG. 4 is a diagram illustrating a list of various boxes of an ISO-based media file format.

Referring to FIG. 4, top level boxes of the ISO-based media file format may include an ftyp box, a moov box, an mdat box, and a meta box. The ftyp box contains information on a file type and compatibility, the moov box is a space for all metadata of timed resources, the mdat box is a storage space of media data, and metadata is inserted into the meta box. A multiview image parameter including a camera parameter and a low fatigue parameter, which is defined in the present invention, is included in a cmsi box that stores information on a multiview image or a monoview image.

The cmsi box may be included in at least one of a sub level box 410 of the moov box, a sub level box 420 of a trak box that is a sub level box of the moov box, a sub level box 430 of the meta box that is a sub level box of the trak box, a sub level box 440 of an mdia box that is a sub level box of the trak box, and a sub level box 450 of an stbl box that is a sub level box of the mdia box, and a sub level box 460 of the meta box that is at the same level as the moov box. Also, from among sub level boxes of the meta box that is a sub level box of the trak box, the cmsi box may be included in a box into which elementary-stream-related information that is inserted into the mdat box, is inserted. The multiview image parameter extraction unit 220 of the multiview image datastream decoding apparatus 200 illustrated in FIG. 2 may extract the multiview image parameter from one of the above-mentioned boxes.

With reference to FIGS. 5, 6, 7A, 7B, 8A, 8B, 9, 10A, 10B, 11, 12A, 12B, 12C, 13A, 13B, and 14, the following will be described below: a method of determining a multiview image parameter by the multiview image parameter determination unit 120 of the multiview image datastream encoding apparatus 100 illustrated in FIG. 1, a position of a multiview image datastream, into which the multiview image parameter insertion unit 130 of the multiview image datastream encoding apparatus 100 illustrated in FIG. 1 inserts the multiview image parameter, a position of the multiview image datastream, from which the multiview image parameter extraction unit 220 of the multiview image datastream decoding apparatus 200 illustrated in FIG. 2 extracts the multiview image parameter, and a method of restoring a multiview image by using the multiview image parameter by the multiview image restoration unit 230 of the multiview image datastream decoding apparatus 200 illustrated in FIG. 2.

FIG. 5 is a diagram illustrating syntax of a low fatigue parameter regarding a multiview image, according to an embodiment of the present invention.

Referring to FIG. 5, the low fatigue parameter may include at least one of a display screen width parameter expected_display_width 510, a display screen height parameter expected_display_height 520, a viewing distance parameter expected_viewing_distance 530, a minimum disparity parameter between view images min_of_disparity 540, and a maximum disparity parameter between view images max_of_disparity 550.

The multiview image parameter determination unit 120 of the multiview image datastream encoding apparatus 100 illustrated in FIG. 1 may determine the display screen width parameter expected_display_width 510, the display screen height parameter expected_display_height 520, and the viewing distance parameter expected_viewing_distance 530 so as to have the same values, that is, representative values for all view images of the multiview image.

Also, the multiview image parameter determination unit 120 may determine the minimum disparity parameter between view images min_of_disparity 540 and the maximum disparity parameter between view images max_of_disparity 550 so as to have values which are relatively defined based on a reference view image of the multiview image.

Thus, the multiview image parameter insertion unit 130 of the multiview image datastream encoding apparatus 100 illustrated in FIG. 1 may insert parameters which are determined so as to have the same values for all view images, from among low fatigue parameters, into an upper level box of a box into which elementary-stream-related information of multiview image information is inserted. For example, the display screen width parameter expected_display_width 510, the display screen height parameter expected_display_height 520, and the viewing distance parameter expected_viewing_distance 530 have the same values for all view images and thus may be inserted into a box that is at the same level as a moov box that is an upper level box of a trak box into which the elementary-stream-related information of the multiview image information, which is included in an mdat box, is inserted.

Also, the multiview image parameter insertion unit 130 may insert parameters which are relatively represented based on the reference view image, from among the low fatigue parameters, into a box that is at the same level as a box into which parameters regarding additional view images which are not the reference view image, are inserted. For example, the minimum disparity parameter between view images min_of_disparity 540 and the maximum disparity parameter between view images max_of_disparity 550 are relatively represented based on the reference view image, and thus may be inserted into a trak box corresponding to an mdat box into which information on the additional view images which are not the reference view image, is inserted, or a box at the same level as the trak box.

Also, the multiview image parameter extraction unit 220 of the multiview image datastream decoding apparatus 200 illustrated in FIG. 2 may extract a multiview image parameter from one of the above-mentioned boxes. The multiview image restoration unit 230 of the multiview image datastream decoding apparatus 200 illustrated in FIG. 2 may correctly analyze the low fatigue parameter in accordance with a method of representing the low fatigue parameter with regard to different views, and may use the low fatigue parameter in order to restore the multiview image.

Figure 6:
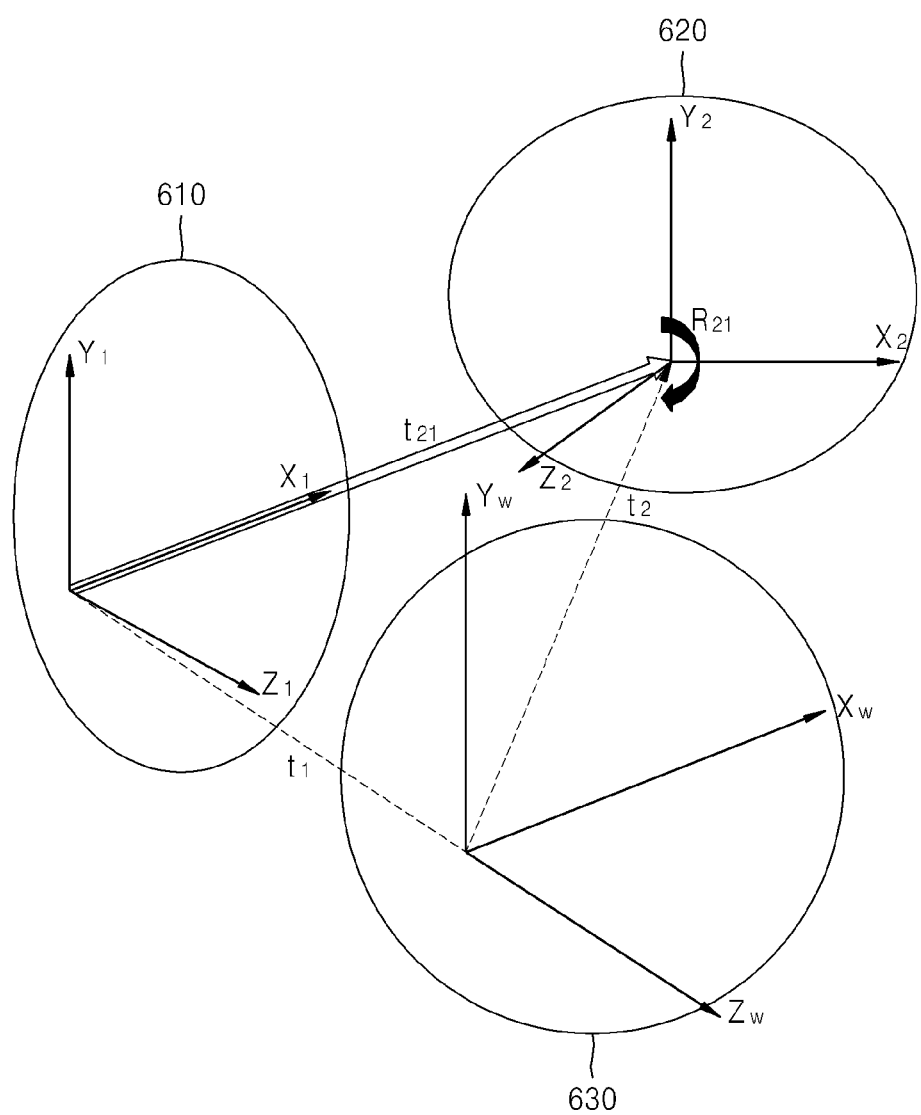
FIG. 6 is a diagram illustrating coordinate systems of cameras for obtaining a multiview image, according to exemplary an embodiment of the present invention.

FIG. 6 is a diagram illustrating coordinate systems of cameras for obtaining a multiview image, according to an embodiment of the present invention.

A camera parameter of a multiview image parameter represents information on the cameras used to obtain the multiview image by representing spatial positions of the cameras on the coordinate systems. For convenience of explanation, FIG. 6 illustrates coordinate systems of cameras used to obtain a stereoscopic image having two views, as an example of the multiview image.

Referring to FIG. 6, a first camera coordinate system 610 is a coordinate system of a first camera used to obtain the stereoscopic image, and a second camera coordinate system 620 is a coordinate system of a second camera used to obtain the stereoscopic image. A world coordinate system 630 is a general coordinate system that is different from the first and second camera coordinate systems 610 and 620.

Mainly two representation methods of the camera parameter may be used.

In a first method, the camera parameter is defined by setting one of the first and second camera coordinate systems 610 and 620 as a reference coordinate system and then setting a position of the other coordinate system. For example, by relatively defining a position of the second camera coordinate system 620 based on the position of the first camera coordinate system 610, a coordinate of a predetermined position on the second camera coordinate system 620, which is relatively defined based on the first camera coordinate system 610, may be defined as the camera parameter. Hereinafter, this representation method of the camera parameter is referred to as 'a relative representation method'.

In a second method, the camera parameter is defined by setting a position of each of the first and second camera coordinate systems 610 and 620 based on the world coordinate system 630. In more detail, based on the world coordinate system 630, a coordinate of a predetermined position on the first camera coordinate system 610 and a coordinate of a predetermined position on the second camera coordinate system 620 may be defined as the camera parameter. Hereinafter, this representation method of the camera parameter is referred to as 'an absolute representation method'.

The camera parameter includes at least one of a translation parameter, a rotation parameter, and a focal length parameter regarding the cameras.

In the relative representation method of the camera parameter, the translation parameter represents a distance of an origin of the second camera coordinate system 620 based on the first camera coordinate system 610. For example, in FIG. 6, $t_{21}=\{t_x, t_y, t_z\}$ may be a value of the translation parameter. The rotation parameter represents a rotation angle of each axis of the second camera coordinate system 620 based on the first camera coordinate system 610. For example, in FIG. 6, $R_{21}=\{R_x, R_y, R_z\}$ may be a value of the rotation parameter.

In the relative representation method of the camera parameter, the first camera coordinate system 610 has a translation matrix defined as $\{t_x, t_y, t_z\}=\{0, 0, 0\}$ and a rotation matrix defined as $\{R_x, R_y, R_z\}=\{0, 0, 0\}$, and thus the camera parameter regarding the first camera coordinate system 610 does not need to be separately defined. That is, the multiview image parameter determination unit 120 of the multiview image datastream encoding apparatus 100 illustrated in FIG. 1 determines a coordinate value on the second camera coordinate system 620, which is relatively defined based on the first camera coordinate system 610, as the camera parameter according to the relative representation method. In other words, the camera parameter regarding the stereoscopic image may be determined by using only a camera parameter regarding one view image.

In a multiview image having three or more views, if any one view camera is set as a reference view camera as in the first camera of FIG. 6 and other cameras are set as cameras disposed at relative positions based on the first camera (reference view camera) as in the second camera of FIG. 6, the camera parameter according to the relative representation method may be obtained by defining coordinate values of predetermined positions on corresponding coordinate systems of the other cameras as relative values based on the first camera.

In the absolute representing method, coordinate values of positions of the first and second camera coordinate systems 610 and 620 are set based on the world coordinate system 630, as the camera parameter. That is, different coordinate values are determined for different camera coordinate systems and thus a separate camera coordinate system is determined for each view. In FIG. 6, the translation parameter regarding the first camera is determined as $t_1$ and the translation parameter regarding the second camera is determined as $t_2$. In the same manner, the rotation parameter represents a rotation angle of each axis of the first camera coordinate system 610 and a rotation angle of each axis of the second camera coordinate system 620, based on the world coordinate system 630.

FIG. 7A is a diagram illustrating syntax of a camera parameter regarding a multiview image, according to an embodiment of the present invention.

Referring to FIG. 7A, in general, each of a translation parameter translation[3] 700 and a rotation parameter rotation[3] 730 has values with regard to three axes of a camera coordinate system and thus may be defined as three values or as a matrix having three values.

In a multiview image considering a three-dimensional effect, it is assumed that every camera has the same value of a focal length parameter focal_length 710 and thus the focal length parameter focal_length 710 may be determined as a focal length of one view camera. However, in an absolute representation method, the focal length parameter focal_length 710 may have a different value for each view camera.

A camera arrangement parameter is_camera_cross 720 indicates whether a plurality of cameras are arranged in a parallel-camera type or a cross-camera type. The rotation parameter rotation[3] 730 may be defined if the camera arrangement parameter is_camera_cross 720 has a value 1, that is, if the cameras are arranged in the cross-camera type.

FIG. 7B is a diagram illustrating syntax of a camera parameter regarding a multiview image, according to another embodiment of the present invention. FIG. 7B will be described in conjunction with FIG. 6.

If the first and second camera coordinate systems 610 and 620 share any one axis, a translation value of an origin of the second camera coordinate system 620 based on the first camera coordinate system 610 may be only defined as a distance on the shared axis. In this case, a translation parameter translation 705 may have one value. Also, a rotation parameter rotation 735 of a certain camera coordinate system may be only defined as a rotation angle of one axis.

The multiview image parameter determination unit 120 of the multiview image datastream encoding apparatus 100 illustrated in FIG. 1 may define a camera parameter as illustrated in FIG. 7A or FIG. 7B. The multiview image restoration unit 230 of the multiview image datastream decoding apparatus 200 illustrated in FIG. 2 may restore a multiview image by analyzing the camera parameter as illustrated in FIG. 7A or FIG. 7B.

Figure 8A:
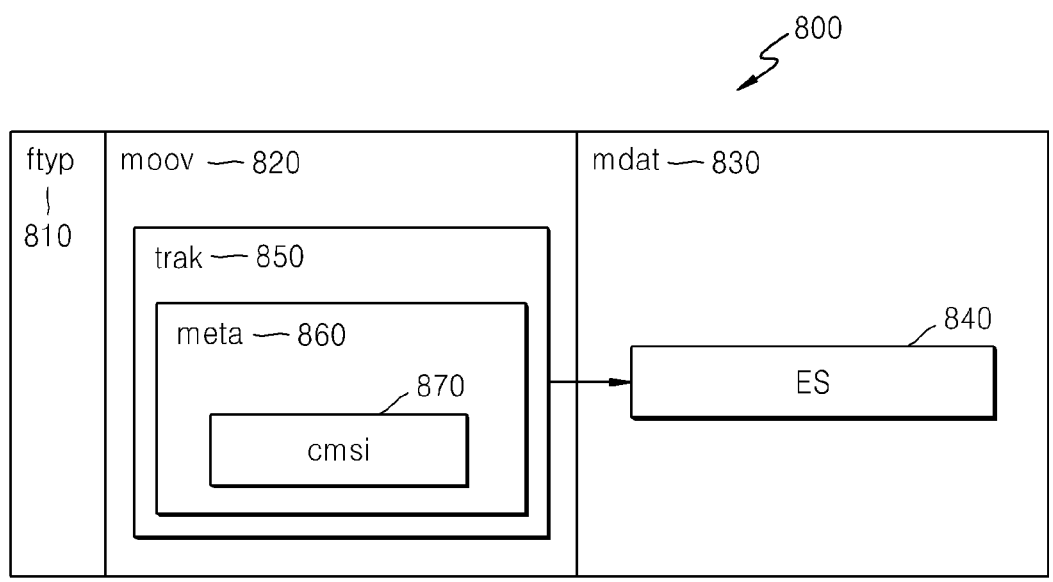
FIG. 8A is a diagram illustrating a multiview image datastream including an elementary stream and a camera parameter that is relatively defined with regard to views, according to an exemplary embodiment of the present invention.

FIG. 8A is a diagram illustrating a multiview image datastream 800 including an elementary stream 840 and a camera parameter that is relatively defined with regard to views, according to an embodiment of the present invention.

Referring to FIG. 8A, if the multiview image datastream 800 is an ISO-based media file format, the multiview image datastream 800 includes an ftyp box 810, a moov box 820, and an mdat box 830. The mdat box 830 includes the elementary stream 840 including multiview image information, and the moov box 820 includes a trak box 850 including a meta box 860 including a cmsi box 870. The trak box 850, the meta box 860, and the cmsi box 870 correspond to the elementary stream 840 and include various types of additional information on the elementary stream 840.

For convenience of explanation, it is assumed that the multiview image datastream 800 includes a stereoscopic image having left and right views, as an example of a multiview image.

The multiview image datastream 800 includes only one elementary stream 840, and composite image information including left view image information and right view image information of the stereoscopic image is inserted into the elementary stream 840.

According to a relative representation method of the camera parameter, which is defined in the present invention, a relatively defined camera parameter regarding a right view image based on a left view image is stored in the cmsi box 870. In the relative representation method, a value of a camera coordinate system of only one view image may be defined as the camera parameter and thus the camera parameter may be set by using only one cmsi box 870. Although the cmsi box 870 is included at a sub level of the meta box 860 that is at a sub level of the trak box 850 in FIG. 8A, alternatively, the cmsi box 870 may be included in any sub level box of the moov box 820. The cmsi box 870 may be included in any region of a header region of the multiview image datastream 800.

Figure 8B:
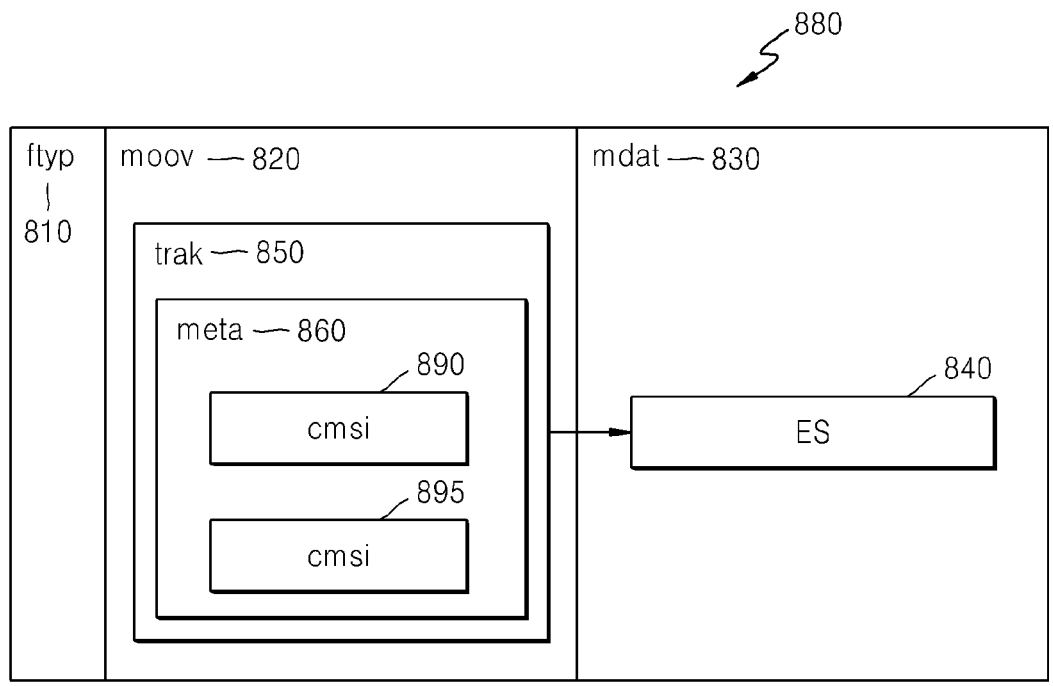
FIG. 8B is a diagram illustrating a multiview image datastream including an elementary stream and a camera parameter that is defined independently for each view, according to an exemplary embodiment of the present invention.

FIG. 8B is a diagram illustrating a multiview image datastream 880 including an elementary stream 840 and a camera parameter that is defined independently for each view, according to an embodiment of the present invention.

Referring to FIG. 8B, the multiview image datastream 880 includes the camera parameter according to an absolute representation method. That is, the camera parameter that is defined independently for each view (camera) of a stereoscopic image, is inserted into the multiview image datastream 880. A meta box 860 of the multiview image datastream 880 includes a cmsi box 890 including left view image information and a cmsi box 895 including right view image information. The camera parameter according to an absolute representation method may be separately inserted into different view image information boxes such as the cmsi boxes 890 and 895.

The multiview image parameter insertion unit 130 of the multiview image datastream encoding apparatus 100 illustrated in FIG. 1 may insert a camera parameter into a box of an ISO-based media file format as illustrated in FIG. 8A or FIG. 8B. The multiview image parameter extraction unit 220 of the multiview image datastream decoding apparatus 200 illustrated in FIG. 2 may extract the camera parameter from the box of the ISO-based media file format as illustrated in FIG. 8A or FIG. 8B.

Figures 9, 10A:
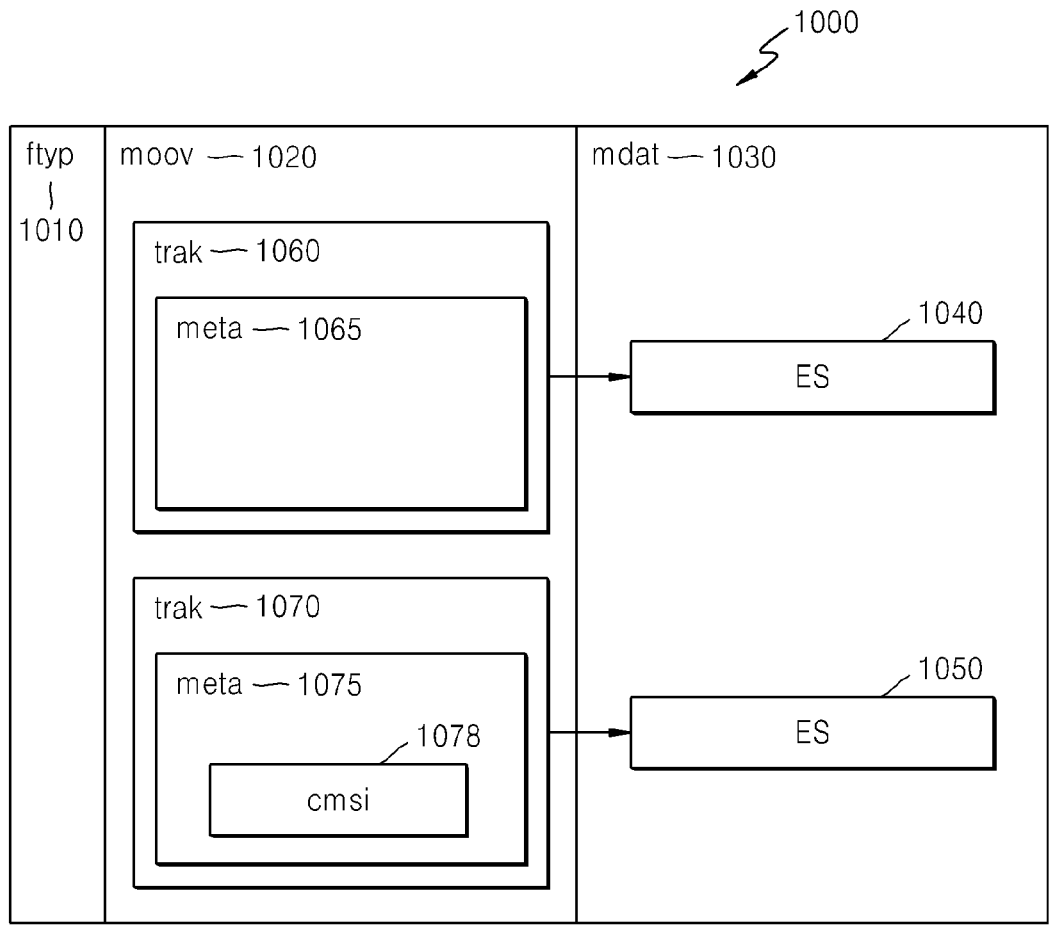
FIG. 9 is a diagram illustrating syntax of a camera parameter that is defined independently for each view, according to an exemplary embodiment of the present invention.
FIG. 10A is a diagram illustrating a multiview image datastream including two elementary streams of a stereoscopic image, and a camera parameter that is relatively defined with regard to views, according to an exemplary embodiment of the present invention.

FIG. 9 is a diagram illustrating syntax of a camera parameter that is defined independently for each view, according to an embodiment of the present invention.

Unlike the cmsi boxes 890 and 895 illustrated in FIG. 8B, which are different view image information boxes into which the camera parameter according to an absolute representation method is separately inserted, the camera parameter including information on each view image may be inserted into one box. Referring to FIG. 9, all of a camera arrangement parameter is_camera_cross 910, a left view image translation parameter translation_L[3] 920, a left view image focal length parameter focal_length_L 930, a left view image rotation parameter rotation_L[3] 940, a right view image translation parameter translation_R[3] 950, a right view image focal length parameter focal_length_R 960, and a right view image rotation parameter rotation_R[3] 970 are defined in the same box.

FIG. 10A is a diagram illustrating a multiview image datastream 1000 including two elementary streams 1040 and 1050 of a stereoscopic image, and a camera parameter that is relatively defined with regard to views, according to an embodiment of the present invention.

Referring to FIG. 10A, the multiview image datastream 1000 is an ISO-based media file format and includes an ftyp box 1010, a moov box 1020 including trak boxes 1060 and 1070 respectively including meta boxes 1065 and 1075, and an mdat box 1030 including the elementary streams 1040 and 1050. The trak box 1060 and the meta box 1065 correspond to the elementary stream 1040 and include additional information on an image inserted into the elementary stream 1040. Likewise, the trak box 1070 and the meta box 1075 correspond to the elementary stream 1050 and include additional information on an image inserted into the elementary stream 1050.

According to an embodiment of the present invention, the multiview image datastream 1000 includes two elementary streams 1040 and 1050 and the stereoscopic image is separately inserted into the elementary streams 1040 and 1050. For example, left view image information of the stereoscopic image is inserted into the elementary stream 1040 and right view image information of the stereoscopic image is inserted into the elementary stream 1050. If two elementary streams exist, left view and right view images may use different encoding units in an encoding operation and use different decoding units in a decoding operation.

If a multiview image parameter regarding the stereoscopic image that is separately inserted into the elementary streams 1040 and 1050, is defined by using a relative representation method, camera information on a right view image of the elementary stream 1050, which is defined based on a left view image of the elementary stream 1040, is determined as the camera parameter. Thus, the camera parameter does not need to be inserted into the trak box 1060 or the meta box 1065 which includes the left view image information of the elementary stream 1040, and is inserted into the trak box 1070 or the meta box 1075 which includes the right view image information of the elementary stream 1050. In FIG. 10A, the camera parameter is defined in a cmsi box 1078 and the cmsi box 1078 is included at a sub level of the meta box 1075.

Figure 10B:
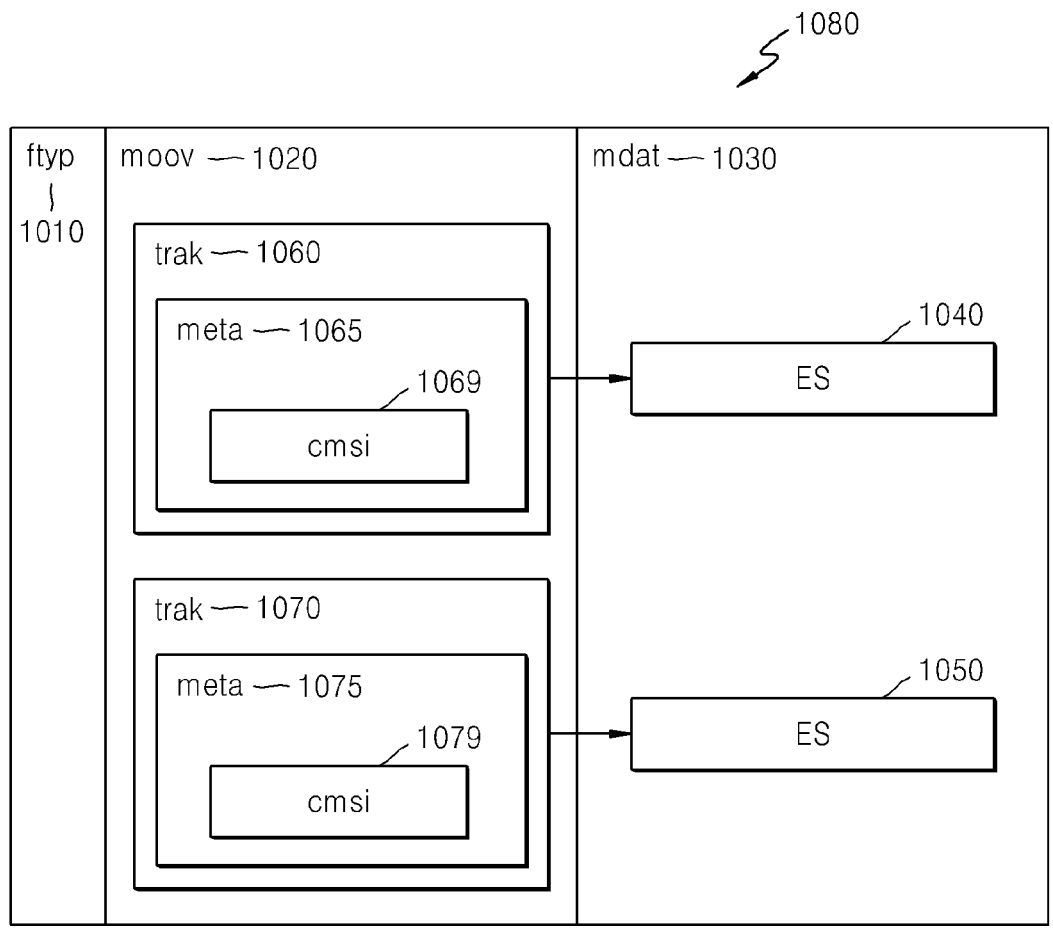
FIG. 10B is a diagram illustrating a multiview image datastream including two elementary streams of a stereoscopic image, and a camera parameter that is defined independently for each view, according to an exemplary embodiment of the present invention.

FIG. 10B is a diagram illustrating a multiview image datastream 1080 including two elementary streams 1040 and 1050 of a stereoscopic image, and a camera parameter that is defined independently for each view, according to an embodiment of the present invention.

Referring to FIG. 10B, if a multiview image parameter regarding stereoscopic image information that is inserted into the elementary streams 1040 and 1050, is defined by using an absolute representation method, the camera parameter is defined independently for each of a left view image of the elementary stream 1040 and a right view image of the elementary stream 1050. Thus, the camera parameter regarding the left view image has to be inserted into a sub level box of at least one of a trak box 1060 and a meta box 1065 which include information on the left view image of the elementary stream 1040, and the camera parameter regarding the right view image has to be inserted into a sub level box of at least one of a trak box 1070 and a meta box 1075 which include information on the right view image of the elementary stream 1050. In FIG. 10B, the camera parameter regarding the left view image is inserted into a cmsi box 1069, the camera parameter regarding the right view image is inserted into a cmsi box 1079, and the cmsi boxes 1069 and 1079 are respectively included at sub levels of the meta boxes 1065 and 1075.

Figure 11:
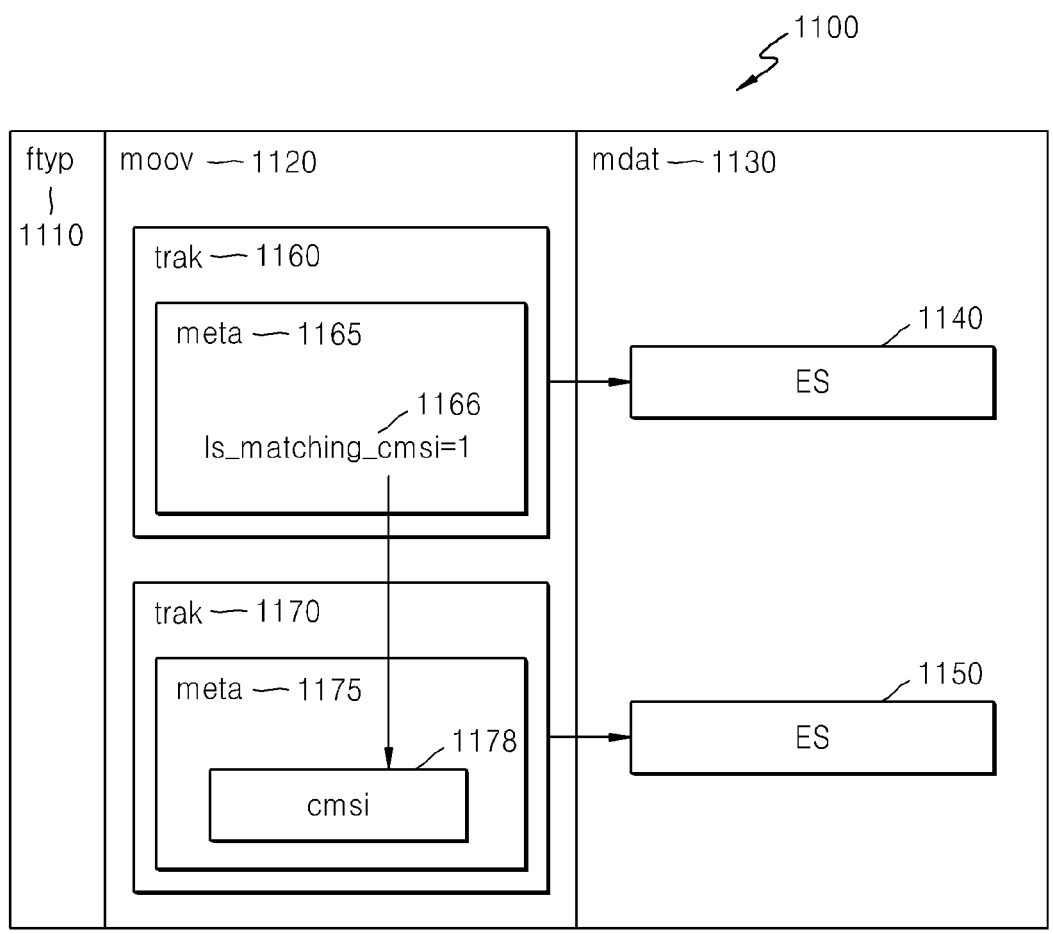
FIG. 11 is a diagram illustrating a multiview image datastream including two elementary streams of a stereoscopic image, and a camera parameter that is relatively defined with regard to views, according to another exemplary embodiment of the present invention.

FIG. 11 is a diagram illustrating a multiview image datastream 1100 including two elementary streams 1140 and 1150 of a stereoscopic image, and a camera parameter that is relatively defined with regard to views, according to another embodiment of the present invention.

Referring to FIG. 11, the multiview image datastream 1100 is an ISO-based media file format and includes an ftyp box 1110, a moov box 1120 including trak boxes 1160 and 1170 respectively including meta boxes 1165 and 1175, and an mdat box 1130 including the elementary streams 1140 and 1150. The trak box 1160 and the meta box 1165 correspond to the elementary stream 1140 and include information on an image inserted into the elementary stream 1140. Likewise, the trak box 1170 and the meta box 1175 correspond to the elementary stream 1150 and include information on an image inserted into the elementary stream 1150.

A multiview image parameter illustrated in FIG. 11 is similar to the multiview image parameter illustrated in FIG. 10A, which is relatively defined with regard to views. However, in FIG. 11, a parameter indicating whether a camera parameter regarding a matching view image of a current view image exists in a multiview image datastream when a camera parameter regarding the current view image is determined (hereinafter, this type of parameter is referred to as a matching view parameter existence parameter), is added as the multiview image parameter. In more detail, if the multiview image parameter regarding a stereoscopic image including left view and right view images is determined by using a relative representation method, the left view and right view images correspond to each other. Thus, the matching view parameter existence parameter regarding the left view image indicates whether the multiview image parameter regarding the right view image exists, and the matching view parameter existence parameter regarding the right view image indicates whether the multiview image parameter regarding the left view image exists.

Referring back to FIG. 11, a multiview image parameter represented in FIG. 11 is similar to the multiview image parameter which is described above with reference to FIG. 10A and is defined by using a relative representation method. However, in FIG. 11, a matching view parameter existence parameter is_matching_csmi 1166 on the left view image is additionally included in the meta box 1165 on the left view image, as the multiview image parameter. The matching view parameter existence parameter is_matching_csmi 1166 indicates whether the multiview image parameter regarding the right view image exists in an additional information box on the right view image, such as the trak box 1170, the meta box 1175, or a cmsi box 1178 of the multiview image datastream 1100. For example, if the matching view parameter existence parameter is_matching_csmi 1166 has a value 1, the multiview image parameter regarding a matching view image exists in the multiview image datastream 1100, and if the matching view parameter existence parameter is_matching_csmi 1166 has a value 0, the multiview image parameter regarding the matching view image does not exist in the multiview image datastream 1100.

When the multiview image datastream decoding apparatus 200 illustrated in FIG. 2 decodes the left view image, the matching view parameter existence parameter is_matching_csmi 1166 may be used to extract the multiview image parameter regarding the right view image and to restore the stereoscopic image, by analyzing a header region of the multiview image datastream 1100 and checking whether the multiview image parameter regarding the right view image exists.

The multiview image parameter insertion unit 130 of the multiview image datastream encoding apparatus 100 illustrated in FIG. 1 may insert a camera parameter into a box of an ISO-based media file format as illustrated in FIG. 10A, FIG. 10B, or FIG. 11. The multiview image parameter extraction unit 220 of the multiview image datastream decoding apparatus 200 illustrated in FIG. 2 may extract the camera parameter from the box of the ISO-based media file format as illustrated in FIG. 10A, FIG. 10B, or FIG. 11.

FIG. 12A is a diagram illustrating syntax of a multiview image parameter according to an embodiment of the present invention.

Referring to FIG. 12A, the syntax in a stereoscopic video media information (svmi) box 1200 defines stereoscopic view information 1210 and stereoscopic view/monoscopic view change information 1260.

The stereoscopic view information 1210 includes a composite image composition parameter stereoscopic_composition_type 1220, a reference view/additional view order parameter is_left_first 1225, and a matching view parameter existence parameter is_matching_csmi 1230.

The composite image composition parameter stereoscopic_composition_type 1220 indicates a method of creating a composite image from left view image information and right view image information of a stereoscopic image. For example, the composite image composition parameter stereoscopic_composition_type 1220 indicates whether the composite image is a vertical line interleaved format, a horizontal line interleaved format, a top-down format, a side-by-side format, a field sequential format, a frame sequential format, a block interleaved format, a disparity map format, a depth map format, a disparity and motion map format, a monoscopic reference view image format, or a monoscopic additional view image format. If the left view image information and the right view image information are separately inserted into two elementary streams, the composite image composition parameter stereoscopic_composition_type 1220 regarding left view and right view images may be respectively set as the monoscopic reference view image format and the monoscopic additional view image format.

The reference view/additional view order parameter is_left_first 1225 indicates information on an arrangement order of the left view image information and the right view image information on elementary streams. For example, the reference view/additional view order parameter is_left_first 1225 determines whether (i) the left view image information is arranged on a main elementary stream and the right view image information is arranged on a sub elementary stream, or (ii) the right view image information is arranged on the main elementary stream and the left view image information is arranged on the sub elementary stream.

The stereoscopic view/monoscopic view change information includes a stereo/mono change count parameter stereo_mono_change_count 1270, a data section number parameter sample_count 1280, and a stereo section start parameter stereo_flag 1290.

If an elementary stream is divided into one or more data sections and a monoscopic image (a left view or right view image) or a composite image of a stereoscopic image is inserted into each data section, the stereo/mono change count parameter stereo_mono_change_count 1270 indicates the number of times that a data section into which a stereoscopic image is inserted is changed into a data section into which a monoscopic image is inserted, or vice versa.

The data section number parameter sample_count 1280 indicates the number of all data sections into which a monoscopic image or a composite image of a stereoscopic image is inserted, in a current elementary stream.

The stereo section start parameter stereo_flag 1290 indicates whether a first data section includes a monoscopic image or a composite image of a stereoscopic image, in a predetermined section of a current elementary stream.

In more detail, the svmi box 1200 includes the matching view parameter existence parameter is_matching_csmi 1230 indicating whether a camera parameter regarding a matching view image of a current view image exists in a current stereoscopic image datastream when a camera parameter regarding the current view image is determined.

In an absolute representation method, a camera parameter of a stereoscopic image does not always include the matching view parameter existence parameter is_matching_csmi 1230. However, if included, a fact that camera parameters on matching view images exist may be indicated by setting the matching view parameter existence parameter is_matching_csmi 1230 on each of the left view and right view images so as to have a value 1.

FIG. 12B is a diagram illustrating syntax of a multiview image parameter according to another embodiment of the present invention.

Referring to FIG. 12B, an svmi box 1202 may include a current view parameter existence parameter is_csmi_here 1240 indicating whether a camera parameter regarding a current view image exists. For example, if the current view parameter existence parameter is_csmi_here 1240 has a value 0, the camera parameter regarding one view image of a current elementary stream does not exist, and if the current view parameter existence parameter is_csmi_here 1240 has a value 1, the camera parameter regarding one view image of the current elementary stream exists.

FIG. 12C is a diagram illustrating syntax of a multiview image parameter according to another embodiment of the present invention.

Referring to FIG. 12C, an svmi box 1204 may include a matching view stream identification parameter matching_ESID_of_csmi 1250 indicating identification information of an elementary stream of a matching view image of a current view image when a multiview image parameter regarding the current view image is determined. The matching view stream identification parameter matching_ESID_of_csmi 1250 may indicate identification information of an elementary stream into which the multiview image parameter corresponding to a view image of a current elementary stream.

For example, if the matching view stream identification parameter matching_ESID_of_csmi 1250 has a value 2, the current elementary stream corresponds to an elementary stream having identification information of the value 2 and the multiview image parameter regarding the current elementary stream is analyzed by using the multiview image parameter regarding the elementary stream having the identification information of the value 2. For example, if the matching view stream identification parameter matching_ESID_of_csmi 1250 has a value 0, an elementary stream having the multiview image parameter corresponding to the current elementary stream does not exist.

The matching view parameter existence parameter is_matching_csmi 1230, the current view parameter existence parameter is_csmi_here 1240, and the matching view stream identification parameter matching_ESID_of_csmi 1250 which are respectively described above with reference to FIGS. 12A, 12B, and 12C may be defined with regard to any other type of a multiview image parameter, in addition to a camera parameter.

The multiview image parameter determination unit 120 of the multiview image datastream encoding apparatus 100 illustrated in FIG. 1 may define a multiview image parameter as illustrated in FIG. 12A, FIG. 12B, or FIG. 12C. The multiview image restoration unit 230 of the multiview image datastream decoding apparatus 200 illustrated in FIG. 2 may restore a multiview image by analyzing the multiview image parameter as illustrated in FIG. 12A, FIG. 12B, or FIG. 12C.

Figure 13A:
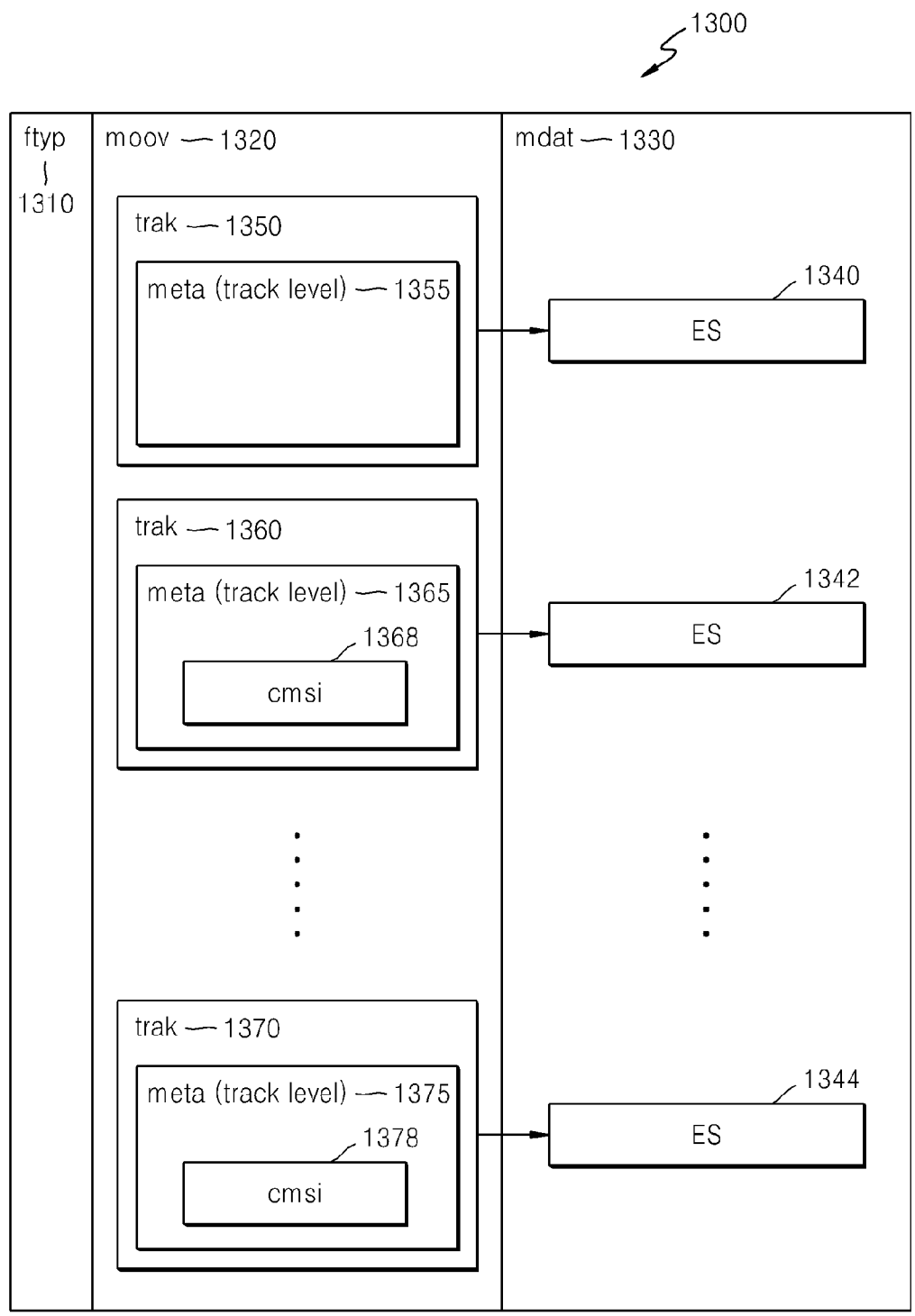
FIG. 13A is a diagram illustrating a multiview image datastream including N elementary streams of a multiview image having N views, and a camera parameter that is relatively defined with regard to views, according to an exemplary embodiment of the present invention.

FIG. 13A is a diagram illustrating a multiview image datastream 1300 including N elementary streams 1340, 1342, . . . , and 1344 of a multiview image having N views, and a camera parameter that is relatively defined with regard to views, according to an embodiment of the present invention.

In addition to a stereoscopic image having two views, the multiview image may have N views. A datastream of the multiview image having N views includes information on N view images. The multiview image having N views includes N or more elementary streams and each of the N view images may be inserted into a different elementary stream.

Referring to FIG. 13A, the multiview image datastream 1300 is an ISO-based media file format and includes an ftyp box 1310, a moov box 1320 including trak boxes 1350, 1360, . . . , and 1370 respectively including meta boxes 1355, 1365, . . . , and 1375, and an mdat box 1330 including the elementary streams 1340, 1342, . . . , and 1344. The trak box 1350 and the meta box 1355 correspond to the elementary stream 1340 that is a main elementary stream, and include information on a first view image inserted into the elementary stream 1340. The trak box 1360 and the meta box 1365 correspond to the elementary stream 1342 that is a first sub elementary stream, and include information on a second view image inserted into the elementary stream 1342. The trak box 1370 and the meta box 1375 correspond to the elementary stream 1344 that is an (n−1)th sub elementary stream, and include information on an nth view image inserted into the elementary stream 1344. (Hereinafter, 2<n≤N.)

If a multiview image parameter regarding multiview image information that is inserted into the elementary streams 1340, 1342, . . . , and 1344, is defined by using a relative representation method, the multiview image information on the second view image (the nth view image) of the elementary stream 1342 (the elementary stream 1344), which is defined based on the first view image of the elementary stream 1340, is determined as the multiview image parameter. Thus, the multiview image parameter does not need to be inserted into the trak box 1350 or the meta box 1355 which includes the information on the first view image of the elementary stream 1340, and is inserted into the trak box 1360 (the trak box 1370) or the meta box 1365 (the meta box 1375) which includes the information on the second view image (the nth view image) of the elementary stream 1342 (the elementary stream 1344). In FIG. 13A, the camera parameter is defined in a cmsi box 1368 (a cmsi box 1378) and the cmsi box 1368 (the cmsi box 1378) is included at a sub level of the meta box 1365 (the meta box 1375).

Accordingly, the multiview image parameter regarding the first view image does not need to be separately stored or extracted.

Figure 13B:
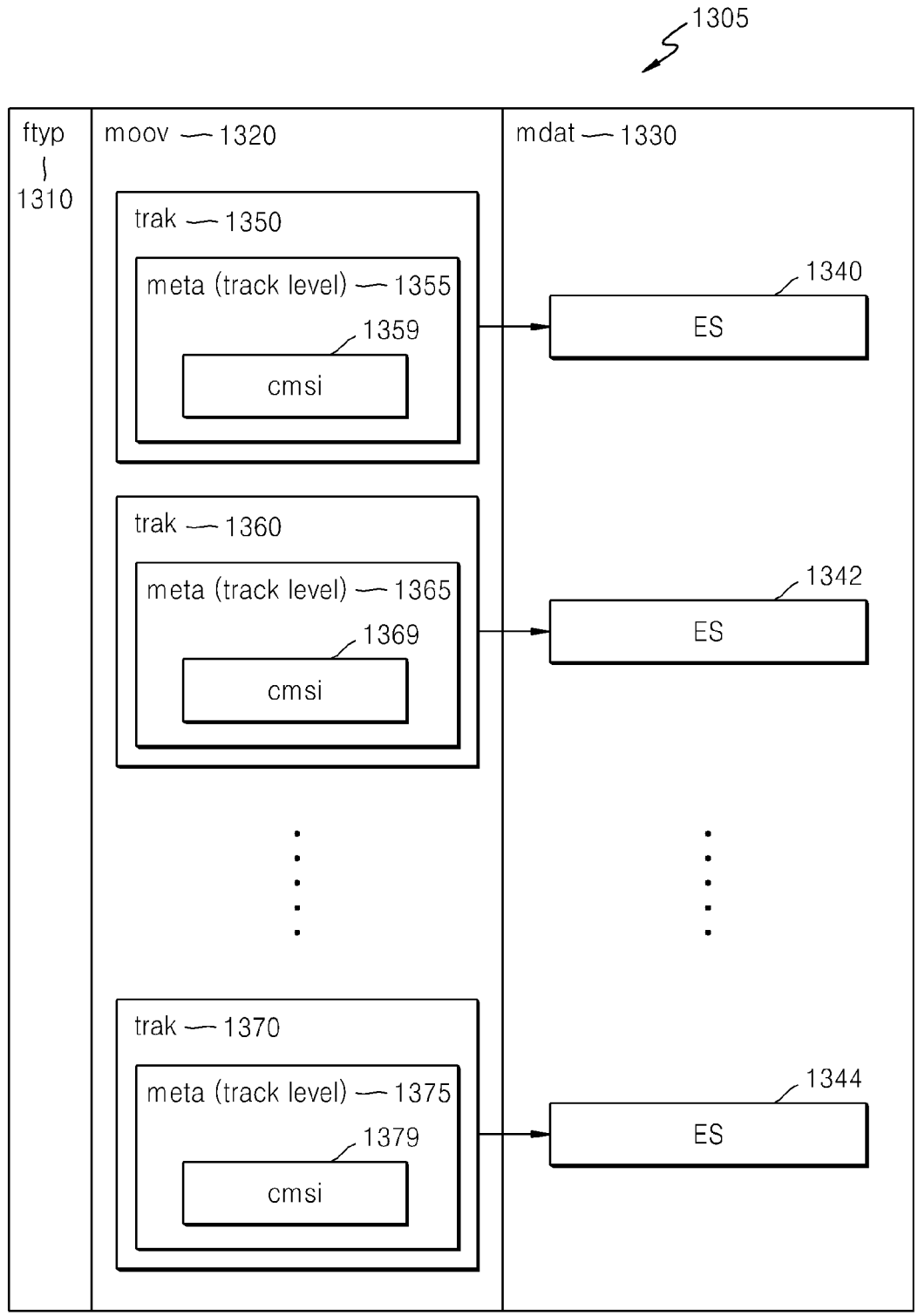
FIG. 13B is a diagram illustrating a multiview image datastream including N elementary streams of a multiview image having N views, and a camera parameter that is defined independently for each view, according to an exemplary embodiment of the present invention.

FIG. 13B is a diagram illustrating a multiview image datastream 1305 including N elementary streams 1340, 1342, . . . , and 1344 of a multiview image having N views, and a camera parameter that is defined independently for each view, according to an embodiment of the present invention.

Referring to FIG. 13B, if a multiview image parameter regarding multiview image information that is inserted into the elementary streams 1340, 1342, . . . , and 1344, is defined by using an absolute representation method, the multiview image parameter is defined independently for each of a first view image of the elementary stream 1340 that is a main elementary stream, a second view image of the elementary stream 1342 that is a first sub elementary stream, and an nth view image of the elementary stream 1344 that is an (n−1)th sub elementary stream. Thus, the multiview image parameter regarding the first view image has to be inserted into a sub level box of at least one of a trak box 1350 and a meta box 1355 which include information on the first view image of the elementary stream 1340, and the multiview image parameter regarding the second view image (the nth view image) has to be inserted into a sub level box of at least one of a trak box 1360 (a trak box 1370) and a meta box 1365 (a meta box 1375) which include information on the second view image (the nth view image) of the elementary stream 1342 (the elementary stream 1344). In FIG. 13B, the multiview image parameter regarding the first view image is inserted into a cmsi box 1359, the multiview image parameter regarding the second view image (the nth view image) is inserted into a cmsi box 1369 (a cmsi box 1379), and the cmsi box 1359 and the cmsi box 1369 (the cmsi box 1379) are respectively included at sub levels of the meta box 1355 and the meta box 1365 (the meta box 1375).

The multiview image datastream structures having three or more views, which are described above with reference to FIGS. 13A and 13B and may be applied to any other type of a multiview image parameter, in addition to a camera parameter.

The multiview image parameter insertion unit 130 of the multiview image datastream encoding apparatus 100 illustrated in FIG. 1 may insert a camera parameter into a box of an ISO-based media file format as illustrated in FIG. 13A or FIG. 13B. The multiview image parameter extraction unit 220 of the multiview image datastream decoding apparatus 200 illustrated in FIG. 2 may extract the camera parameter from the box of the ISO-based media file format as illustrated in FIG. 13A or FIG. 13B.

Figures 14, 15:
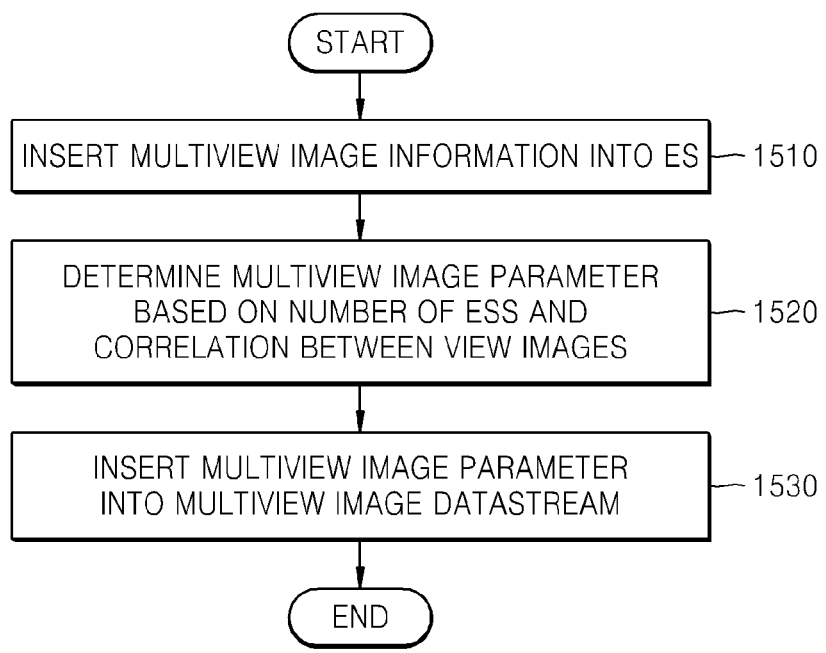
FIG. 14 is a diagram illustrating syntax of a multiview image parameter that is additionally defined with regard to a multiview image having N views, according to an exemplary embodiment of the present invention.
FIG. 15 is a flowchart of a multiview image datastream encoding method according to an exemplary embodiment of the present invention.

FIG. 14 is a diagram illustrating syntax of a multiview image parameter that is additionally defined with regard to a multiview image having N views, according to an embodiment of the present invention.

Referring to FIG. 14, a multiview image datastream according to the current embodiment of the present invention may include a multiview video information (mvvi) box 1400 into which a set of multiview image information on three or more views is inserted.

The multiview image parameter of the mvvi box 1400 may include at least one of a first view parameter is_main_view 1410 indicating an elementary stream of a first view image, a view arrangement order parameter view_ordering 1420 indicating an arrangement order of each view, and a view identification parameter view_ID 1430 indicating each view, in addition to a camera parameter and a low fatigue parameter.

The first view parameter is_main_view 1410 may indicate a position of an elementary stream into which first view image information is inserted, from among a plurality of elementary streams in the multiview image datastream. For example, if the first view parameter is_main_view 1410 has a value 1, it is verified that image information of a current elementary stream is the first view image information. If the first view parameter is_main_view 1410 has a value 0, it is verified that the image information of the current elementary stream is any other view image information that is not the first view image information.

The view identification parameter view_ID 1430 indicates identification information or view order information of each view.

If it is assumed that values of the view identification parameter view_ID 1430 are marked from a left side to a right side, the view arrangement order parameter view_ordering 1420 indicates whether a view arrangement order is an ascending order or a descending order. For example, if the view arrangement order parameter view_ordering 1420 has a value 1, a far left view image is inserted into an elementary stream having the view identification parameter view_ID 1430 having a value 0. Also, a far right view image is inserted into an elementary stream having the view arrangement order parameter view_ordering 1420 having a value 0 and the view identification parameter view_ID 1430 having a value 0. According to an embodiment of the present invention, the mvvi box 1400 may be included in a trak box of a multiview image datastream of an ISO-based media file format.

The multiview image parameter determination unit 120 of the multiview image datastream encoding apparatus 100 illustrated in FIG. 1 may define a multiview image parameter as illustrated in FIG. 14. The multiview image restoration unit 230 of the multiview image datastream decoding apparatus 200 illustrated in FIG. 2 may restore a multiview image by analyzing the multiview image parameter as illustrated in FIG. 14.

FIG. 15 is a flowchart of a multiview image datastream encoding method according to an embodiment of the present invention.

Referring to FIG. 15, in operation 1510, multiview image information including information on at least one view image of a multiview image is inserted into at least one elementary stream of a multiview image datastream.

The multiview image datastream may include at least one elementary stream. If only one elementary stream exists, a composite image that is created by combining a plurality of view images may be inserted into the elementary stream. If the number of elementary streams is equal to or greater than the number of views of the multiview image, each view image may be inserted into a different elementary stream.

In operation 1520, a multiview image parameter is determined based on the number of elementary streams and a correlation between view images of the multiview image.

The multiview image parameter may be defined based on whether a plurality of elementary streams exist. Also, the multiview image parameter may be defined independently for each view image, or multiview image information on an additional view image, which is set based on a predetermined reference view image, may be determined as the multiview image parameter.

In operation 1530, the multiview image parameter is inserted into the multiview image datastream.

If the multiview image datastream is an ISO-based media file format, the multiview image parameter may be inserted into a header region of the multiview image datastream, and more particularly, into a predetermined box corresponding to an elementary stream in a payload region of the header region, into which a predetermined view image is inserted.

Figure 16:
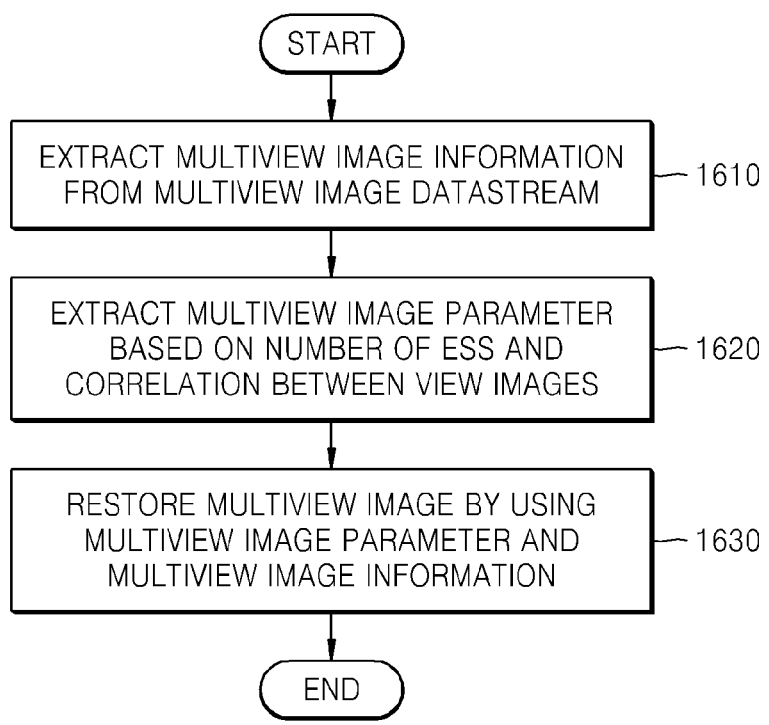
FIG. 16 is a flowchart of a multiview image datastream decoding method according to an exemplary embodiment of the present invention.

FIG. 16 is a flowchart of a multiview image datastream decoding method according to an embodiment of the present invention.

Referring to FIG. 16, in operation 1610, multiview image information including information on at least one view image of a multiview image is extracted from at least one elementary stream of a received multiview image datastream.

If the multiview image datastream is an ISO-based media file format, the multiview image information may be extracted from an mdia box, and an mdat box may include at least one elementary stream. Only one view image information may be extracted from each elementary stream, or composite image information including information on a plurality of view images may be extracted from an elementary stream.

In operation 1620, a multiview image parameter is extracted from the multiview image datastream based on the number of elementary streams and a correlation between view images of the multiview image.

A camera parameter or a low fatigue parameter may be extracted as the multiview image parameter, and the multiview image parameter may be extracted from a predetermined box in a header region of the multiview image datastream that is an ISO-based media file format.

In operation 1630, the multiview image is restored by using the extracted multiview image parameter and the extracted multiview image information.

The multiview image parameter that is extracted from the header region is analyzed in consideration of the number of elementary streams and the correlation between view images, and the multiview image information that is extracted from the elementary stream is restored by using the analyzed multiview image parameter.

Figure 17:
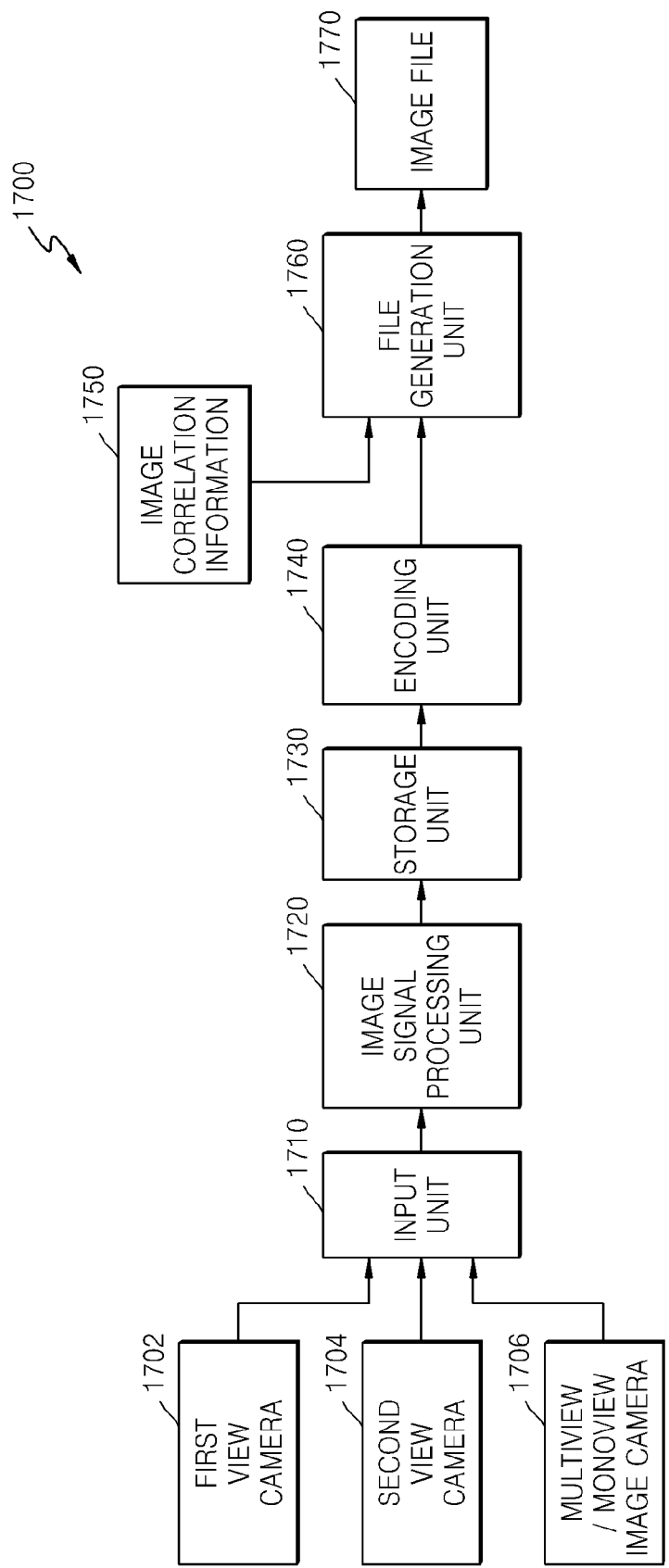
FIG. 17 is a block diagram of a stereoscopic image file generation system using a stereoscopic image datastream generation method, according to an exemplary embodiment of the present invention.

FIG. 17 is a block diagram of a stereoscopic image file generation system 1700 using a stereoscopic image datastream generation method, according to an embodiment of the present invention.

Referring to FIG. 17, the stereoscopic image file generation system 1700 includes a first view camera 1702, a second view camera 1704, a multiview/monoview image camera 1706, an input unit 1710, an image signal processing unit 1720, a storage unit 1730, an encoding unit 1740, and a file generation unit 1760.

The first and second view cameras 1702 and 1704 photograph a predetermined subject at first and second views so as to output different first and second view images, respectively. If a monoview image is also captured by the stereoscopic image file generation system 1700, a monoscopic image is output from the multiview/monoview image camera 1706. An image output from each of the first and second view cameras 1702 and 1704 and the multiview/monoview image camera 1706 is input to the input unit 1710.

The image input to the input unit 1710 is pre-processed by the image signal processing unit 1720. For example, external image values, which are analog values, are converted into digital values. Here, the external image values mean components of light and colors which are recognized by a sensor of a charge-coupled device (CCD) type or a complementary metal-oxide semiconductor (CMOS) type.

The storage unit 1730 stores image data of the pre-processed image and provides the image data to the encoding unit 1740. Although the storage unit 1730 is separately illustrated, the stereoscopic image file generation system 1700 may further include other storage elements for buffering between the other elements of the stereoscopic image file generation system 1700, which are not the storage unit 1730.

The encoding unit 1740 encodes the image data received from the storage unit 1730. If necessary, the encoding of the image data by the encoding unit 1740 may be omitted.

The file generation unit 1760 inserts image correlation information 1750 and the (encoded) image data received from the encoding unit 1740, into a predetermined file format so as to generate an image file 1770. The image correlation information 1750 may include reference information of a track box for representing correlations between images, and handler information for representing a media type of each image.

Also, the image correlation information 1750 may include two-dimensional (2D) image-related information and three-dimensional (3D) image-related information. The 3D image-related information represents a correlation between the first and second view images, and may include information on 2D/3D data sections, information on an arrangement method of the first and second view images, information on an image file type, a camera parameter, display information, and disparity information.

According to an embodiment of the present invention, the file generation unit 1760 may store the image data and the image correlation information 1750 respectively in a media data region and a header region of the image file 1770. If the image file 1770 is an ISO-based media file format, the image data may be stored in the form of an elementary stream, in an mdat box, and the image correlation information 1750 may be stored in a trak box or any sub-level box of the trak box.

The image file 1770 is input or transmitted to a 3D image file reproduction apparatus.

Figure 18:
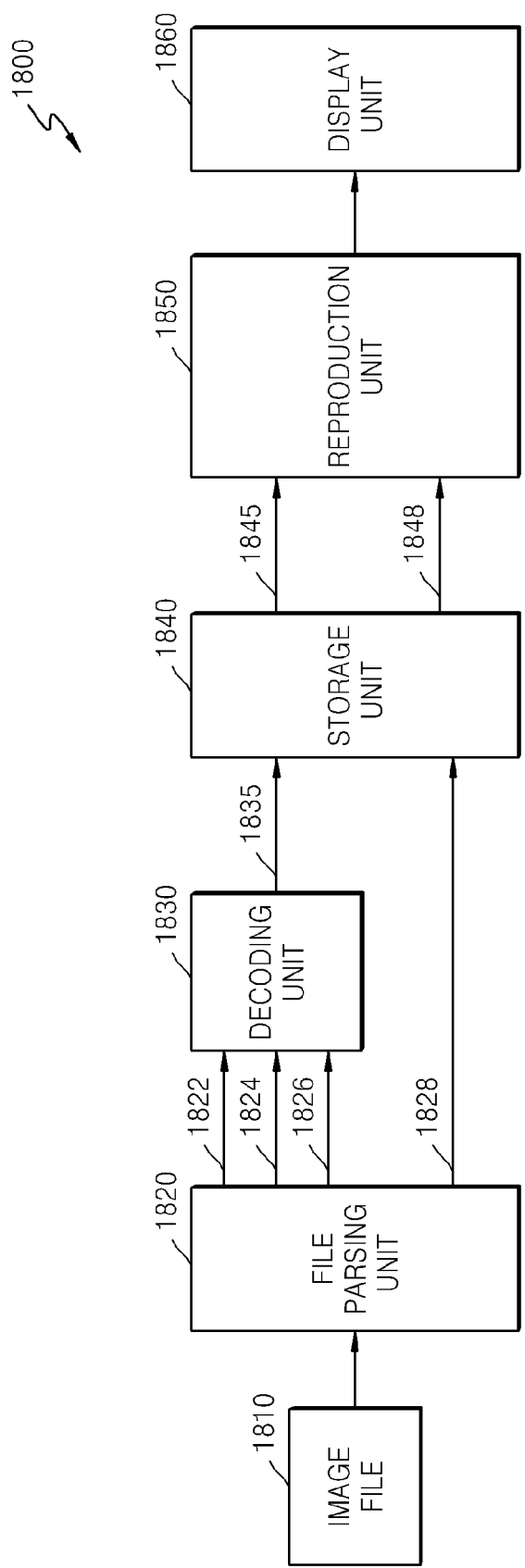
FIG. 18 is a block diagram of a stereoscopic image restoration/reproduction system using a stereoscopic image restoration method, according to an exemplary embodiment of the present invention.

FIG. 18 is a block diagram of a stereoscopic image restoration/reproduction system 1800 using a stereoscopic image restoration method, according to an embodiment of the present invention.

Referring to FIG. 18, the stereoscopic image restoration/reproduction system 1800 includes a file parsing unit 1820, a decoding unit 1830, a storage unit 1840, a reproduction unit 1850, and a display unit 1860.

The file parsing unit 1820 parses a received image file 1810. After information stored in each of an ftyp box, a moov box, a trak box, and a meta box is parsed, image data stored in an mdat box may be extracted. First view image data 1822, second view image data 1824, and multiview/monoview image data 1826 may be extracted as the image data. By parsing the image file 1810, image data-related information 1828 may also be extracted. The image data-related information 1828 may include correlation information between images, such as trak reference information regarding related tracks.

The decoding unit 1830 receives and decodes the image data including the first view image data 1822, the second view image data 1824, and the multiview/monoview image data 1826 which are extracted from the image file 1810. The decoding is performed only if the image data in the image file 1810 has been encoded. The storage unit 1840 receives and stores (decoded) image data 1835 that is output from the decoding unit 1830, and the extracted image data-related information 1828 that is extracted by the file parsing unit 1820.

The reproduction unit 1850 receives image reproduction-related information 1848 and image data 1845 to be reproduced, from the storage unit so as to reproduce an image. The image reproduction-related information 1848 is information required to reproduce the image from among the image data-related information 1828, and includes image correlation information.

The reproduction unit 1850 may reproduce the image data 1845 in a 2D or 3D image reproduction method, by using the image reproduction-related information 1848. For example, the reproduction unit 1850 may combine and reproduce correlated stereoscopic images by referring to image data identification information. Also, the reproduction unit 1850 may reproduce the correlated stereoscopic images and a monoscopic image together, by referring to the image data identification information and 2D/3D data section information.

The display unit 1860 may display the image reproduced by the reproduction unit 1850, on a screen. The display unit 1860 may be a barrier liquid crystal display (LCD). A monoscopic image may be displayed when the barrier LCD is turned off, and each view image of a stereoscopic image may be displayed when the barrier LCD is turned on.

Embodiments of the present invention can be written as computer programs and can be implemented in general-use digital computers that execute the programs using a computer readable recording medium or a computer readable transmission medium. Examples of the computer readable recording medium include magnetic storage media (e.g., ROM, floppy disks, hard disks, etc.) and optical recording media (e.g., CD-ROMs, or DVDs). Examples of the compute readable transmission medium include storage media such as carrier waves (e.g., transmission through the Internet).

As described above, a multiview image datastream encoding method and a multiview image datastream encoding apparatus according to exemplary embodiments of the present invention create a multiview image datastream including a multiview image parameter that is defined in order to effectively reproduce a three-dimensional (3D) image, and an appropriate position into which the multiview image parameter is inserted is determined in an International Standards Organization (ISO)-based media file format so that the multiview image datastream may be generally used.

Furthermore, a multiview image datastream decoding method and a multiview image datastream decoding apparatus according to exemplary embodiments of the present invention correctly and effectively restore a 3D image by extracting a multiview image parameter from a multiview image datastream. Also, a low-fatigue-related process for reducing fatigue of a user that may occur when the 3D image is viewed, may be performed, by using a low fatigue parameter of the extracted multiview image parameter. In addition, quality of the 3D image may be improved through various methods such as an epipolar line constraint method and a distortion rectification method, by using the multiview image parameter.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of encoding a multiview image datastream comprising at least one elementary stream, the method comprising:
    inserting multiview image information including information on at least one view image of a multiview image, into the elementary stream of the multiview image datastream;
    determining a multiview image parameter regarding the multiview image based on the number of elementary streams and a correlation between view images of the multiview image; and
    inserting the multiview image parameter into a predetermined position of the multiview image datastream,
    wherein the predetermined position of the multiview image datastream, into which the multiview image parameter is inserted, is determined based on the number of elementary streams and the correlation between view images of the multiview image,
    wherein, when a plurality of view images of the multiview image are encoded into a plurality of elementary streams in a one-to-one correspondence, the multiview image parameter includes a parameter indicating identification information of an elementary stream of a matching view image of a current view image, wherein the parameter indicates identification information of an elementary stream into which the multiview image parameter corresponding to a current elementary stream is inserted,
    wherein the number of elementary streams is determined based on whether information on each view image is included in one elementary stream, or information on a plurality of view images of the multiview image is inserted into a plurality of elementary streams in a one-to-one correspondence,
    wherein the correlation between view images of the multiview image is whether each view image refers to information on another view image when a parameter regarding the multiview image is determined, and
    wherein the determining of the multiview image parameter further comprises determining a parameter indicating whether the multiview image parameter regarding the matching view image of the current view image exists when the multiview image parameter regarding the current view image is determined.

2. The method of claim 1, wherein the multiview image parameter comprises at least one of a camera parameter regarding cameras for obtaining the multiview image, and a low fatigue parameter for stably viewing the multiview image.

3. The method of claim 2, wherein the low fatigue parameter comprises at least one of a display screen width parameter, a display screen height parameter, a viewing distance parameter, a maximum disparity parameter between view images, and a minimum disparity parameter between view images.

4. The method of claim 2, wherein the camera parameter comprises at least one of a translation parameter, a rotation parameter, and a focal length parameter regarding the cameras,
wherein the translation parameter is defined as one value if camera coordinate systems of the view images share an axis, and is defined as a matrix having two or more values if the camera coordinate systems of the view images do not share an axis, and
wherein the rotation parameter is defined as one value or a matrix having two or more values.

5. The method of claim 4, wherein the inserting of the multiview image information comprises inserting a composite image comprising all view images of the multiview image, into one elementary stream of the multiview image datastream, and
wherein the determining of the multiview image parameter comprises relatively defining the camera parameter for each of additional view images which are not a reference view image of the multiview image, based on the reference view image.

6. The method of claim 4, wherein the number of elementary streams included in the multiview image datastream is equal to or greater than the number of the view images of the multiview image, and the inserting of the multiview image information comprises inserting each view image into a different elementary stream, and
wherein the determining of the multiview image parameter comprises relatively defining the camera parameter regarding each of additional view images which are not a reference view image of the multiview image, based on the reference view image.

7. The method of claim 1, wherein the determining of the multiview image parameter further comprises determining a parameter indicating whether the multiview image parameter regarding a current view image exists.

8. The method of claim 1, wherein, if the multiview image has three or more views, the determining of the multiview image parameter further comprises determining at least one of a parameter indicating an elementary stream of a reference view image, a parameter indicating each view, and a parameter indicating an arrangement order of each view.

9. The method of claim 1, wherein, if the multiview image datastream is an International Standards Organization (ISO)-based media file format, the ISO-based media file format comprises a moov box, an mdat box, and a meta box, and
wherein the inserting of the multiview image parameter comprises inserting the multiview image parameter into at least one of a sub level box of the meta box, a sub level box of the moov box, a sub level box of a trak box that is a sub level box of the moov box, a sub level box of a trak box, and a sub level box of a meta box that is a sub level box of the trak box.

10. The method of claim 9, wherein, if the multiview image parameter regarding each of additional view images which are not a reference view image of the multiview image, is relatively defined based on the reference view image, the inserting of the multiview image parameter comprises inserting the multiview image parameter regarding each of the additional view images, into a box at the same level as a box corresponding to an elementary stream of each of the additional view images.

11. A computer readable recording medium having recorded thereon a computer program for executing the method of claim 1.

12. A method of decoding a multiview image datastream comprising at least one elementary stream, the method comprising:
extracting multiview image information including information on at least one view image of a multiview image, from the elementary stream of the multiview image datastream;
extracting a multiview image parameter regarding the multiview image from a predetermined position of the multiview image based on the number of elementary streams and a correlation between view images of the multiview image; and
restoring the multiview image by using the extracted multiview image parameter and the extracted multiview image information,
wherein the predetermined position of the multiview image datastream, into which the multiview image parameter is inserted, is determined based on the number of elementary streams and the correlation between view images of the multiview image,
wherein, when a plurality of view images of the multiview image are encoded into a plurality of elementary streams in a one-to-one correspondence, the multiview image parameter includes a parameter indicating identification information of an elementary stream of a matching view image of a current view image, wherein the parameter indicates identification information of an elementary stream into which the multiview image parameter corresponding to a current elementary stream is inserted,
wherein the number of elementary streams is determined based on whether information on each view image is included in one elementary stream, or information on a plurality of view images of the multiview image is inserted into a plurality of elementary streams in a one-to-one correspondence,
wherein the correlation between view images of the multiview image is whether each view image refers to information on another view image when a parameter regarding the multiview image is determined, and
wherein the extracting of the multiview image parameter further comprises extracting a parameter indicating whether the multiview image parameter regarding the matching view image of the current view image exists when the multiview image parameter regarding the current view image is determined, from the multiview image datastream.

13. The method of claim 12, wherein the multiview image parameter comprises at least one of a camera parameter regarding cameras used to obtain the multiview image, and a low fatigue parameter for stably viewing the multiview image.

14. The method of claim 13, wherein the low fatigue parameter comprises at least one of a display screen width parameter, a display screen height parameter, a viewing distance parameter, a maximum disparity parameter between view images, and a minimum disparity parameter between view images.

15. The method of claim 14, wherein the camera parameter comprises at least one of a translation parameter, a rotation parameter, and a focal length parameter regarding the cameras,
wherein the translation parameter is defined as one value if camera coordinate systems of the view images share an axis, and is defined as a matrix having two or more values if the camera coordinate systems of the view images do not share an axis, and wherein the rotation parameter is defined as one value or a matrix having two or more values.

16. The method of claim 13, wherein the extracting of the multiview image information comprises extracting a composite image comprising all view images of the multiview image, from one elementary stream of the multiview image datastream, and wherein the extracting of the multiview image parameter comprises extracting the camera parameter that is relatively defined on each of additional view images which are not a reference view image of the multiview image, based on the reference view image, from the multiview image datastream.

17. The method of claim 13, wherein, if the number of elementary streams included in the multiview image datastream is equal to or greater than the number of the view images of the multiview image, the extracting of the multiview image information comprises extracting each view image from a different elementary stream, and wherein the extracting of the multiview image parameter comprises extracting the camera parameter that is relatively defined on each of additional view images which are not a reference view image of the multiview image, based on the reference view image, from the multiview image datastream.

18. The method of claim 12, wherein the extracting of the multiview image parameter further comprises extracting a parameter indicating whether the multiview image parameter regarding a current view image exists, from the multiview image datastream.

19. The method of claim 12, wherein, if the multiview image has three or more views, the extracting of the multiview image parameter further comprises extracting at least one of a parameter indicating an elementary stream of a reference view image, a parameter indicating each view, and a parameter indicating an arrangement order of each view, from the multiview image datastream.

20. The method of claim 12, wherein, if the multiview image datastream is an International Standards Organization (ISO)-based media file format, the ISO-based media file format comprises a moov box, an mdat box, and a meta box, and wherein the extracting of the multiview image parameter comprises extracting the multiview image parameter from at least one of a sub level box of the meta box, a sub level box of the moov box, a sub level box of a trak box that is a sub level box of the moov box, a sub level box of a trak box, and a sub level box of a meta box that is a sub level box of the trak box.

21. The method of claim 20, wherein, if the multiview image parameter is defined independently for each view image of the multiview image, the extracting of the multiview image parameter comprises extracting the multiview image parameter from a box at the same level as a box corresponding to an elementary stream of each view image.

22. The method of claim 20, wherein, if the multiview image parameter is defined independently for each view image of the multiview image, the extracting of the multiview image parameter comprises extracting the multiview image parameter from one predetermined box in a header region of the multiview image datastream.

23. The method of claim 21, wherein, if the multiview image parameter regarding each of additional view images which are not a reference view image of the multiview image, is relatively defined based on the reference view image, the extracting of the multiview image parameter comprises extracting the multiview image parameter regarding each of the additional view images, from a box at the same level as a box corresponding to an elementary stream of each of the additional view images.

24. A computer readable recording medium having recorded thereon a computer program for executing the method of claim 12.

25. An apparatus for encoding a multiview image datastream comprising at least one elementary stream, the apparatus comprising:

a multiview image information insertion unit which inserts multiview image information including information on at least one view image of a multiview image, into the elementary stream of the multiview image datastream;

a multiview image parameter determination unit which determines a multiview image parameter regarding the multiview image based on the number of elementary streams and a correlation between view images of the multiview image; and a multiview image parameter insertion unit which inserts the multiview image parameter into a predetermined position of the multiview image datastream, wherein the predetermined position of the multiview image datastream, into which the multiview image parameter is inserted, is determined based on the number of elementary streams and the correlation between view images of the multiview image, wherein, when a plurality of view images of the multiview image are encoded into a plurality of elementary streams in a one-to-one correspondence, the multiview image parameter includes a parameter indicating identification information of an elementary stream of a matching view image of a current view image, wherein the parameter indicates identification information of an elementary stream into which the multiview image parameter corresponding to a current elementary stream is inserted, wherein the number of elementary streams is determined based on whether information on each view image is included in one elementary stream, or information on a plurality of view images of the multiview image is inserted into a plurality of elementary streams in a one-to-one correspondence, wherein the correlation between view images of the multiview image is whether each view image refers to information on another view image when a parameter regarding the multiview image is determined, and wherein the multiview image parameter determination unit further determines a parameter indicating whether the multiview image parameter regarding the matching view image of the current view image exists when the multiview image parameter regarding the current view image is determined.

26. The apparatus of claim 25, wherein the multiview image parameter comprises at least one of a camera parameter regarding cameras used to obtain the multiview image, and a low fatigue parameter for stably viewing the multiview image.

27. The apparatus of claim 26, wherein the low fatigue parameter comprises at least one of a display screen width parameter, a display screen height parameter, a viewing distance parameter, a maximum disparity parameter between view images, and a minimum disparity parameter between view images.

28. The apparatus of claim 26, wherein the camera parameter comprises at least one of a translation parameter, a rotation parameter, and a focal length parameter regarding the cameras, wherein the translation parameter is defined as one value if camera coordinate systems of the view images share an axis, and is defined as a matrix having two or more values if the camera coordinate systems of the view images do not share an axis, and wherein the rotation parameter is defined as one value or a matrix having two or more values.

29. The apparatus of claim 28, wherein the multiview image information insertion unit inserts a composite image comprising all view images of the multiview image, into one elementary stream of the multiview image datastream, and wherein the multiview image parameter determination unit relatively defines the camera parameter regarding each of additional view images which are not a reference view image of the multiview image, based on the reference view image.

30. The apparatus of claim 28, wherein the number of elementary streams included in the multiview image datastream is equal to or greater than the number of the view images of the multiview image, and the multiview image information insertion unit inserts each view image into a different elementary stream, and wherein the multiview image parameter determination unit relatively represents the camera parameter regarding each of additional view images which are not a reference view image of the multiview image, based on the reference view image.

31. The apparatus of claim 25, wherein the multiview image parameter determination unit further determines a parameter indicating whether the multiview image parameter regarding a current view image exists.

32. The apparatus of claim 25, wherein, if the multiview image has three or more views, the multiview image parameter determination unit further determines at least one of a parameter indicating an elementary stream of a reference view image, a parameter indicating each view, and a parameter indicating an arrangement order of each view.

33. The apparatus of claim 25, wherein, if the multiview image datastream is an International Standards Organization (ISO)-based media file format, the ISO-based media file format comprises a moov box, an mdat box, and a meta box, and wherein the multiview image parameter insertion unit inserts the multiview image parameter into at least one of a sub level box of the meta box, a sub level box of the moov box, a sub level box of a trak box that is a sub level box of the moov box, a sub level box of a trak box, and a sub level box of a meta box that is a sub level box of the trak box.

34. The apparatus of claim 33, wherein, if the multiview image parameter regarding each of additional view images which are not a reference view image of the multiview image, is relatively defined based on the reference view image, the multiview image parameter insertion unit inserts the multiview image parameter regarding each of the additional view images, into a box at the same level as a box corresponding to an elementary stream of each of the additional view images.

35. An apparatus for decoding a multiview image datastream comprising at least one elementary stream, the apparatus comprising:

a multiview image information extraction unit which extracts multiview image information including information on at least one view image of a multiview image, from the elementary stream of the multiview image datastream;

a multiview image parameter extraction unit which extracts a multiview image parameter regarding the multiview image from a predetermined position of the multiview image based on the number of elementary streams and a correlation between view images of the multiview image; and a multiview image restoration unit which restores the multiview image by using the extracted multiview image parameter and the extracted multiview image information, wherein the predetermined position of the multiview image datastream, into which the multiview image parameter is inserted, is determined based on the number of elementary streams and the correlation between view images of the multiview image, wherein, when a plurality of view images of the multiview image are encoded into a plurality of elementary streams in a one-to-one correspondence, the multiview image parameter includes a parameter indicating identification information of an elementary stream of a matching view image of a current view image, wherein the parameter indicates identification information of an elementary stream into which the multiview image parameter corresponding to a current elementary stream is inserted, wherein the number of elementary streams is determined based on whether information on each view image is included in one elementary stream, or information on a plurality of view images of the multiview image is inserted into a plurality of elementary streams in a one-to-one correspondence, wherein the correlation between view images of the multiview image is whether each view image refers to information on another view image when a parameter regarding the multiview image is determined, and wherein the multiview image parameter extraction unit further extracts a parameter indicating whether the multiview image parameter regarding the matching view image of the current view image exists when the multiview image parameter regarding the current view image is determined, from the multiview image datastream.

36. The apparatus of claim 35, wherein the multiview image parameter comprises at least one of a camera parameter regarding cameras used to obtain the multiview image, and a low fatigue parameter for stably viewing the multiview image.

37. The apparatus of claim 36, wherein the low fatigue parameter comprises at least one of a display screen width parameter, a display screen height parameter, a viewing distance parameter, a maximum disparity parameter between view images, and a minimum disparity parameter between view images.

38. The apparatus of claim 36, wherein the camera parameter comprises at least one of a translation parameter, a rotation parameter, and a focal length parameter regarding the cameras, wherein the translation parameter is defined as one value if camera coordinate systems of the view images share an axis, and is defined as a matrix having two or more values if the camera coordinate systems of the view images do not share an axis, and wherein the rotation parameter is defined as one value or a matrix having two or more values.

39. The apparatus of claim 36, wherein the multiview image information extraction unit extracts a composite image comprising all view images of the multiview image, from one elementary stream of the multiview image datastream, and wherein the multiview image parameter extraction unit extracts the camera parameter that is relatively defined on each of additional view images which are not a reference view image of the multiview image, based on the reference view image, from the multiview image datastream.

40. The apparatus of claim 36, wherein, if the number of elementary streams included in the multiview image datastream is equal to or greater than the number of the view images of the multiview image, the multiview image information extraction unit extracts each view image from a different elementary stream, and wherein the multiview image parameter extraction unit extracts the camera parameter that is relatively defined on each of additional view images which are not a reference view image of the multiview image, based on the reference view image, from the multiview image datastream.

41. The apparatus of claim 35, wherein the multiview image parameter extraction unit further extracts a parameter indicating whether the multiview image parameter regarding a current view image exists, from the multiview image datastream.

42. The apparatus of claim 35, wherein, if the multiview image has three or more views, the multiview image parameter extraction unit further extracts at least one of a parameter indicating an elementary stream of a reference view image, a parameter indicating each view, and a parameter indicating an arrangement order of each view, from the multiview image datastream.

43. The apparatus of claim 35, wherein, if the multiview image datastream is an International Standards Organization (ISO)-based media file format, the ISO-based media file format comprises a moov box, an mdat box, and a meta box, and wherein the multiview image parameter extraction unit extracts the multiview image parameter from at least one of a sub level box of the meta box, a sub level box of the moov box, a sub level box of a trak box that is a sub level box of the moov box, a sub level box of a trak box, and a sub level box of a meta box that is a sub level box of the trak box.

44. The apparatus of claim 35, wherein, if the multiview image parameter regarding each of additional view images which are not a reference view image of the multiview image, is relatively defined based on the reference view image, the multiview image parameter extraction unit extracts the multiview image parameter regarding each of the additional view images, from a box at the same level as a box corresponding to an elementary stream of each of the additional view images.

* * * * *